(12) United States Patent
Helou

(10) Patent No.: US 9,955,793 B2
(45) Date of Patent: May 1, 2018

(54) INFLATABLE CUSHION AND AIR VALVE FOR SAME

(71) Applicant: IPX PTY LTD, Neutral Bay, New South Wales (AU)

(72) Inventor: Mohammed Helou, Neutral Bay (AU)

(73) Assignee: IPX PTY LTD, Neutral Bay (AU)

( * ) Notice: Subject to any disclaimer, the term of this patent is extended or adjusted under 35 U.S.C. 154(b) by 341 days.

(21) Appl. No.: 14/391,871

(22) PCT Filed: Apr. 11, 2013

(86) PCT No.: PCT/AU2013/000389
§ 371 (c)(1),
(2) Date: Oct. 10, 2014

(87) PCT Pub. No.: WO2013/152404
PCT Pub. Date: Oct. 17, 2013

(65) Prior Publication Data
US 2015/0059099 A1 Mar. 5, 2015

(30) Foreign Application Priority Data

Apr. 11, 2012 (AU) ................................ 2012901425

(51) Int. Cl.
*F16K 31/05* (2006.01)
*A47C 27/08* (2006.01)
*A47G 9/10* (2006.01)
*F16K 1/30* (2006.01)
*F16K 31/56* (2006.01)
*F16K 15/20* (2006.01)
*A47G 9/00* (2006.01)

(52) U.S. Cl.
CPC .......... *A47C 27/088* (2013.01); *A47G 9/1027* (2013.01); *F16K 1/302* (2013.01); *F16K 15/20* (2013.01); *F16K 31/566* (2013.01); *A47G 2009/003* (2013.01); *A47G 2009/1018* (2013.01)

(58) Field of Classification Search
CPC ....................................... F16K 31/05
USPC .......... 251/213, 321, 254; 141/313, 351–352
See application file for complete search history.

(56) References Cited

U.S. PATENT DOCUMENTS 4,829,614 A   5/1989   Harper
5,881,783 A * 3/1999   Chou ..................... F16K 15/18
                                                    141/313

(Continued)

FOREIGN PATENT DOCUMENTS

FR          2612450 A1   9/1988
JP       2001-087107 A   4/2001
JP       2003-135223 A   5/2003

*Primary Examiner* — Fredrick C Conley
(74) *Attorney, Agent, or Firm* — Gordon & Jacobson, P.C.

(57) ABSTRACT

An inflatable cushion including: an inflatable body, having an upper surface and a lower surface, said body including an air-impermeable skin defining a chamber, an elastic foam core within said chamber and a sealable air valve; and an external elastic foam layer substantially covering at least one of said upper and lower of surfaces; wherein: the foam core is formed of a foam having a density of between about 15 kg/m3 and about 35 kg/ma and a hardness of between about 25 newtons and about 45 newtons; and the foam layer is formed of a foam having a density of between about 35 kg/m3 and about 65 kg/m3 and a hardness of between about 35 newtons and about 95 newtons.

12 Claims, 14 Drawing Sheets

(56) References Cited

U.S. PATENT DOCUMENTS

| | | |
|---|---|---|
| 6,016,582 A | 1/2000 | Larson |
| 6,047,425 A | 4/2000 | Khazaal |
| 6,327,725 B1 | 12/2001 | Veilleux et al. |
| 6,397,415 B1 | 6/2002 | Hsieh |

* cited by examiner

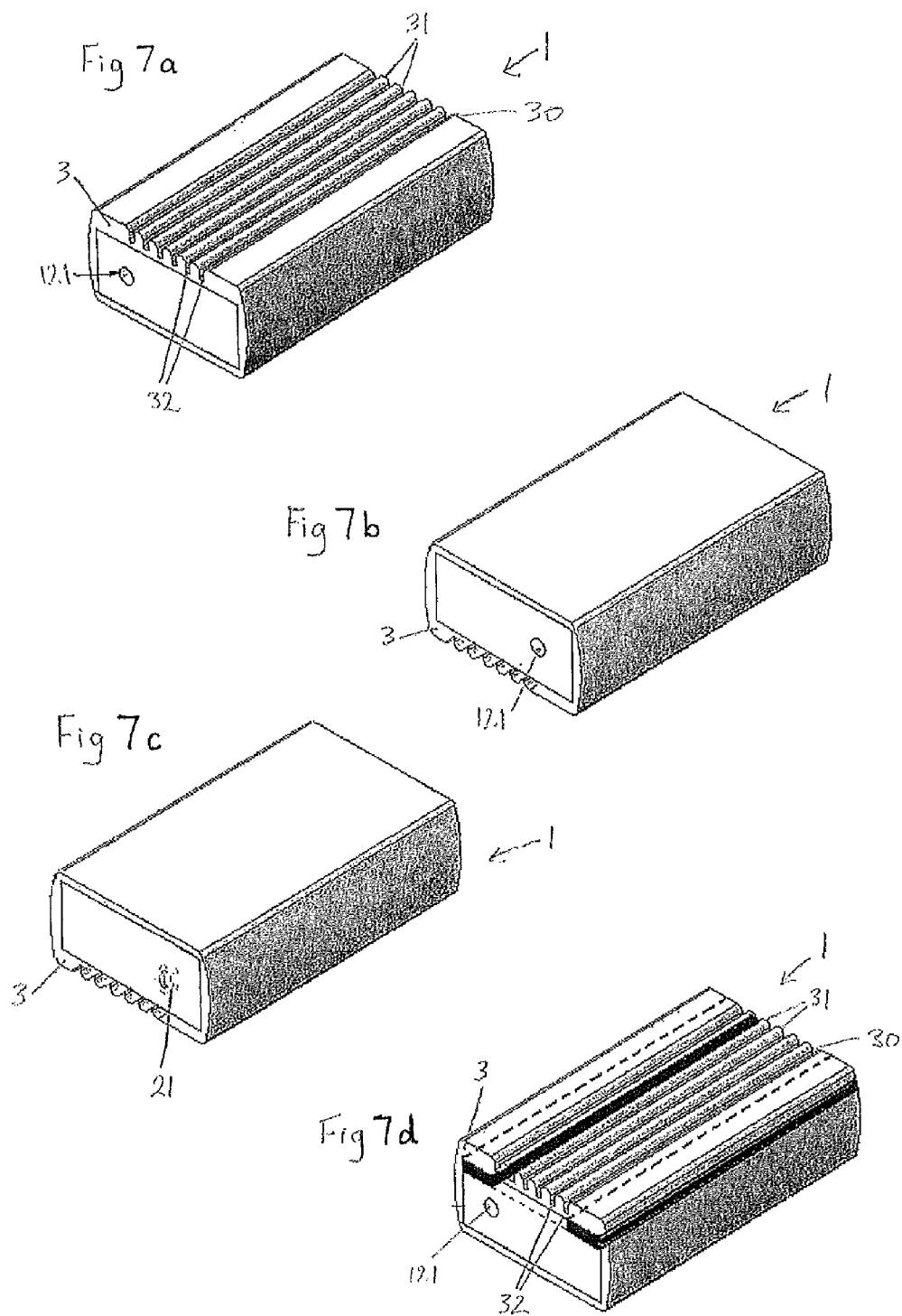

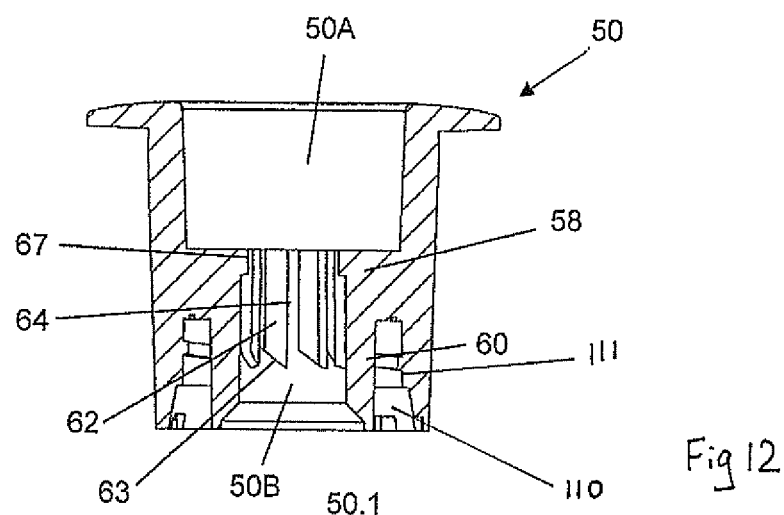
Fig 12
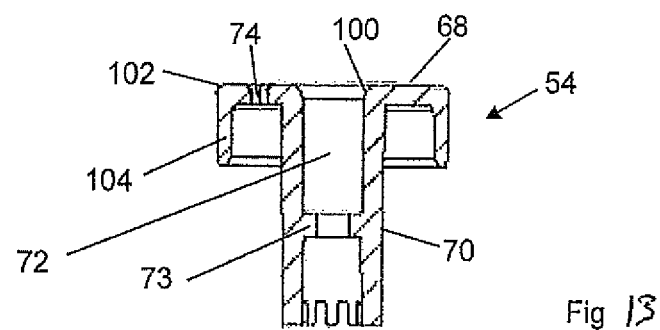
Fig 13
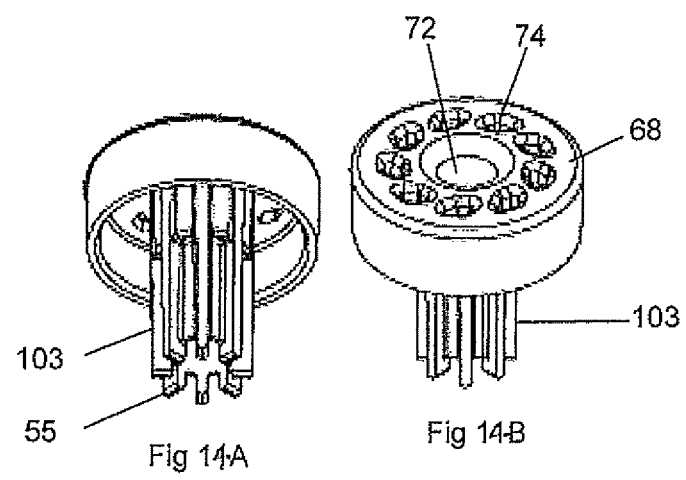
Fig 14-A  Fig 14-B

INFLATABLE CUSHION AND AIR VALVE FOR SAME

This application is the national stage of International Patent Application No. PCT/AU2013/000389 filed on Apr. 11, 2013, which claims priority to Australian Patent Application No. AU 2012901425 filed on Apr. 11, 2012, all of which are hereby incorporated by reference in their entireties as if fully set forth herein.

BACKGROUND

1. Field

The present invention relates to an inflatable cushion and, in particular, a self-inflatable cushion particularly for chiropractic or orthopaedic use.

The present invention also relates to a mattress including the abovementioned inflatable cushion.

The present invention further relates to an air valve assembly for use in the abovementioned inflatable cushion.

2. Related Art

Cushions, including pillows, are extensively used in domestic, recreational and therapeutic applications. The demand for comfortable cushions is very great and this demand is increasing as the standard of living continues to rise, particularly in Western societies.

Cushions also have many uses in the healthcare fields, particularly in relation to persons who have chiropractic, orthopaedic or similar complaints.

As is well understood, typical cushions incorporate an external coating (or skin) which encloses a soft inner core. This inner core is generally formed of feathers, soft foam or other similar materials.

Inflatable cushions have also been developed. Such cushions generally consist of an inflatable bladder, an internal chamber, and a sealable air valve for enabling air to enter (and exit from) the chamber. In these products, air is typically blown or pumped into the chamber, via the air valve, by the user. Such products have become popular in camping applications because of their light weight, ability to be deflated into a small volume, and their ease of use.

Such products also have been used in chiropractic and orthopaedic fields. For instance, U.S. Pat. No. 6,047,025, in the name of Adnan Khazaal, discloses an 'orthopaedic pillow' which incorporates a hollow inflatable bladder which is able to be inflated by means of a hand pump.

Similarly, U.S. Pat. No. 6,327,725, describes a 'pillow with adjustable neck support' which includes a foam pillow having 'an inflatable airtight chamber . . . for providing adjustable support to the user's neck'. The hollow chamber is adapted to be inflated by a manual hand pump.

Another U.S. Pat. No. 4,829,614, discloses a pillow having an adjustable neck support which includes a number of separately inflatable hollow chambers within the pillow.

A further U.S. Pat. No. 6,397,415, discloses an 'orthopaedic pillow' having an inflatable hollow air chamber and a separate water chamber.

A benefit of inflatable cushions is that they can, generally, be inflated to any desired level according to the requirements or desires of a user. For instance, if a firmer cushion is desired, it can be inflated up to (or near) its full capacity. If, however, a softer cushion is desired, it may only need to be partially inflated. This can be particularly advantageous in the fields of chiropracty and orthopaedics where it is beneficial to be able to select and alter the degree of firmness/softness of a cushion for use with a patient.

In more recent times, self-inflatable products (such as mattresses and cushions) have been developed. These products typically consist of an inflatable bladder, an internal chamber with a compressible foam substance within the chamber, and an air valve. When not in use, air is expelled from the product and the foam within the internal chamber is compressed and the air valve is sealed shut. When the product is to be used (e.g. as a mattress), the air valve is opened, enabling air to enter into the chamber. This then enables the foam substance to expand to its natural expanded state. As the foam expands, this causes further air to enter into the internal chamber, thereby causing the product to self inflate. Such a product is disclosed in U.S. Pat. No. 6,016,582 in the name of Lynn D. Larson.

A problem associated with existing inflatable cushions (including pillows) is that they tend to exhibit a bouncy feel when in use. For instance, when fully inflated, the cushion is hard and uncomfortable to lie on. When under-inflated, the cushion tends to provide inadequate support. Somewhere in-between the fully inflated and the under-inflated states, there may be a state which is reasonably comfortable for a user. However, it is time-consuming and awkward for a user to try and identify this state as it involves manually opening the valve (typically by rotating a rotatable cap), expelling air or blowing air in, re-trying the cushion (for comfort) and if not comfortable, repeating the process (perhaps several times).

Also, inflatable cushions tend not to provide any resistance—and therefore no real support—against any sideways or rotational movement of the head (or other part of the body). Accordingly, such inflatable cushions can be rather uncomfortable. Also, and for similar reasons, such inflatable cushions may be disadvantageous to persons suffering orthopaedic or chiropractic problems.

In the fields of chiropractic and orthopaedic treatments, it is desirable to have cushions which do provide adequate support to a user's head (or other body part). It is further desirable to have a cushion which is adapted to vary in firmness depending on the size of the user, the user's particular condition, or the degree of firmness of the cushion which is desired by the user. Alternatively, quite a wide range of cushions, of different sizes and/or differing firmness, need to be produced to satisfy the various needs of different users or the same user at different times. None of the products described above satisfy these criteria.

SUMMARY

Accordingly, one aspect of the present invention is directed to an inflatable cushion which at least ameliorates some of the problems and/or deficiencies of some of the existing products described above. In particular, this aspect of the present invention is directed to an improved self-inflatable cushion which is adapted to vary in firmness according to a user's requirements.

Another aspect of the present invention is directed to a mattress comprising (as part of the mattress) an inflatable cushion according to the first aspect of the invention, whereby the firmness of a portion of the mattress is able to be varied according to a user's requirements.

As noted above, self-inflatable products (such as mattresses and cushions) incorporate air valves to enable air to be selectively inserted into, or expelled from, the relevant product.

Typically, such air valves generally include a rotatable cylindrical outer wall which is adapted to rotate between a valve-open position and a valve-closed position (and vice versa). In order to enable air to enter through the air valve, the cylindrical outer wall is positioned in its valve-open position. Once the desired amount of air has been inserted into the inflatable product, the cylindrical outer wall is manually rotated in one direction to its valve-closed position. Similarly, when the air valve needs to be re-opened (e.g. to allow air to be expelled from the product) the cylindrical outer wall is manually rotated in the opposite direction to a valve-open position.

Although such air valves work reasonably well, the manual rotation of the cylindrical outer wall between the valve-open and the valve-closed positions can be somewhat awkward and time consuming, particularly for aged or infirm persons who may lack manual dexterity or strength. This can be particularly problematic or frustrating when the air valve needs to be opened and closed numerous times in a relatively short period of time.

As noted above, one of the beneficial uses of inflatable cushions is in the field of chiropracty and orthopaedics where cushions of variable firmness/softness may be required. In this field, in particular, it would be desirable to have a cushion in which the firmness/softness can be easily and readily varied to accommodate the differing needs of one or more patients. The abovementioned known and commonly used air valves are inconvenient in such situations owing to the need to rotate manually the outer cylindrical wall, between the valve-open and valve-closed positions, each time one wishes to change the firmness/softness of the cushion.

Accordingly, a further aspect of the present invention is directed to an air-valve, adapted for use in an inflatable cushion, which at least ameliorates some of the problems and/or deficiencies of the existing air valves discussed above. In particular, this further aspect of the present invention is directed to an air-valve which is adapted to transition between a valve-open position and a valve-closed position without having to manually rotate an outer cylindrical wall of the air valve.

Any reference herein to known prior art does not, unless the contrary indication appears, constitute an admission that such prior art is commonly known by those skilled in the art to which the invention relates, at the priority date of this application.

According to a first aspect of the present invention, there is provided an inflatable cushion including:
an inflatable body, having an upper surface and a lower surface, said body including an air-impermeable skin defining a chamber, an elastic foam core within said chamber and a sealable air valve; and
an external elastic foam layer substantially covering at least one of said upper and lower of surfaces;
wherein the density and hardness of the foam core and of the elastic foam layer differ by no more than about 30%.

Preferably, the density and hardness of the foam core and of the foam layer differ by no more than about 15%. It is particularly preferred that the density and hardness of the foam core and of the foam layer are substantially identical. The foam core and the foam layer may, therefore, be formed of the same material.

In this first aspect of the invention, it is preferable that foam used in the foam core and the foam layer has a density of between about 20 kg/m$^3$ and 120 kg/m$^3$. It is further preferred that the foam has a density of between about 30 kg/m$^3$ and 80 kg/m$^3$. In a particularly preferred embodiment, the foam has a density of about 50 kg/m$^3$.

According to a second aspect of the present invention, there is provided an inflatable cushion including:

an inflatable body, having an upper surface and a lower surface, said body including an air-impermeable skin defining a chamber, an elastic foam core within said chamber and a sealable air valve; and
an external elastic foam layer substantially covering at least one of said upper and lower of surfaces;
wherein:
the foam core is formed of a foam having a density of between about 15 kg/m$^3$ and about 35 kg/m$^3$ and a hardness of between about 25 newtons and about 45 newtons; and
the foam layer is formed of a foam having a density of between about 35 kg/m$^3$ and about 65 kg/m$^3$ and a hardness of between about 35 newtons and about 95 newtons.

The 'hardness' of a foam product is characterised as the force (expressed in Newtons) required to compress a standard sized piece of foam to 40% of its original height, is between 35 and 55 Newtons.

In a preferred embodiment of the second aspect of the present invention, the foam core is formed of a foam having a density of between about 18 kg/m$^3$ and about 25 kg/m$^3$ and a hardness of between about 30 newtons and about 35 newtons.

In a particularly preferred embodiment, the foam core is formed of a foam having a density of about 18 kg/m$^3$ and a hardness of about 35 newtons.

In a further preferred embodiment of the second aspect of the present invention, the foam layer is formed of a foam having a density of between about 45 kg/m$^3$ and about 55 kg/m$^3$ and a hardness of between about 50 newtons and about 70 newtons.

In a particularly preferred embodiment, the foam layer is formed of a foam having a density of about 52 kg/m$^3$ and a hardness of about 60 newtons.

The following paragraphs, [035] to [060], relate to both the first aspect and the second aspect of the present invention (unless indicated to the contrary).

Typically, the foam core occupies substantially all of the chamber of the inflatable body. This foam core may be adhered to an internal surface of the air-impermeable skin. This enables the inflation and deflation of the inflatable cushion to correspond entirely with the inflation and deflation of the chamber and inhibits any bubbling effect.

As the above described inflatable cushion incorporates a foam core, within the chamber, this effectively causes the cushion to be self-inflating. Once the sealable air valve is opened, the foam core (which typically will have been compressed), and hence the cushion, will naturally tend towards an expanded/inflated state. That is, if the foam core is in a compressed state and the air valve is opened, the foam core will expand to its natural state, thereby causing the chamber to expand which causes air to be drawn in through the air valve.

It is also preferred that the foam layer is adhered to at least one of said upper and lower surfaces of the inflatable body. In a particularly preferred embodiment, the foam layer substantially covers both of the upper and lower surfaces of the inflatable body. In this embodiment, it is preferred that the foam layer is adhered to both the upper and lower surfaces of the inflatable body.

In a further preferred embodiment, the inflatable cushion further comprises a neck support strip extending substantially along at least one side of said cushion. The neck support strip may be formed of foam having a higher density and/or higher hardness factor than that of the foam of the external elastic foam layer. In this embodiment, it is particularly preferred that the neck support strip is positioned between the upper surface of the inflatable body and the foam layer or between the lower surface of the inflatable body and the foam layer. In a typical inflatable cushion for use as a pillow, which has a generally rectangular shape, the neck support strip typically extends substantially along at least one of the long sides of said cushion.

Although the foam core and the foam layer may be formed of any suitable foam material, it is preferred that at least one of said foam core and said foam layer are formed of visco-elastic foam.

It is particularly preferred that the foam layer is formed of visco-elastic foam. If desired, the foam core may also be formed of visco-elastic foam.

Visco-elastic foam (also sometimes known as 'slow recovery' or 'memory' foam) is a low resilience' (LR) foam which is better adapted to contour to the body shape of a user and/or to reduce pressure on the relevant portion of a user's body. Visco-elastic foams are typified by their slow recovery after compression. This characteristic of visco-elastic foam causes the foam to progressively conform to the shape of an object laid upon it (e.g. a human head) and then, once the object has been removed, to slowly re-assume its original shape.

Other beneficial features of visco-elastic foams are their ability to dampen vibrations and absorb shocks. These features are particularly advantageous where users have chiropractic or orthopaedic problems.

A further beneficial feature of visco-elastic foams is that they tend to respond to body temperature and ambient temperature, typically softening with heat. This further enhances the foam's ability to adjust to the shape or contour of the user's head or other body part. Accordingly, visco-elastic foams are particularly well suited for use as the foam material for the foam layer of the subject inflatable cushion.

The visco-elastic foam used in the foam layer, according to the second aspect of this invention, preferably has a density of between about 15 $kg/m^3$ and 35 $kg/m^3$. It is further preferred that the visco-elastic foam has a density of between about 18 $kg/m^3$ and 25 $kg/m^3$. In a particularly preferred embodiment, the visco-elastic foam has a density of about 18 $kg/m^3$.

The firmness of visco-elastic foam is generally measured in terms of its ILD (indentation load deflection) rating. Generally, a 25% ILD rating indicates the weight required to achieve a 25% compression of a 4" thick foam using a 50 square inch compression.

The visco-elastic foam used in the present invention preferably has an ILD rating of from 10 pounds (4.5 kg) @ 25% ILD to 60 lbs (27 kg) @ 25% ILD.

In one preferred embodiment of the first aspect of this invention, the relevant visco-elastic foam material is Dunlop Foam's Viscoflex® foam.

In a preferred embodiment of the second aspect of this invention, the relevant visco-elastic foam material for the foam layer is Dunlop Foam's Viscoflex® foam. In this aspect of the invention, a visco-elastic foam material having a lower density is preferred for the foam core.

Dunlop Foam's Viscoflex® foam is published as having the following technical parameters. Its nominal density is published as 52 $kg/m^3$. Its hardness range, characterised as the force (expressed in Newtons) required to compress a standard sized piece of foam to 40% of its original height, is between 35 and 55 Newtons. Its indentation factor, that is, the ratio of forces required to compress the foam to 65% and to 25% of its original height, is 2.67 for the VF52-40 (white foam) and 2.11 for the VF52-60 (yellow foam). Its resilience is about 5% for the VF52-40 (white foam) and about 10% for the VF52-60 (yellow foam). According to Dunlop Foams, "resilience" is "measured by dropping a steel ball onto a standard sized piece of foam and measuring the distance that the ball bounces back. The height of the drop divided by the height of the bounce equals the foam's resilience percentage." The low resilience level of the Viscoflex® foam, of from about 5% to 10%, is substantially lower than the resilience levels of other foams (such as those used for chairs, lounges and the like) which generally have resilience levels of between about 40% and about 60%.

It is further preferred that the air-impermeable skin is formed of a substance which minimises any rustling sound when a user's head (or other body part) moves on the cushion. In one preferred embodiment of this aspect of the invention, the air-impermeable skin of the pillow is formed of latex rubber. Alternatively, the air-impermeable skin may be formed of vinyl.

As will be appreciated, the inflatable cushion may be used as a pillow, a seat cushion, a back support, a leg support or in a number of other ways.

In an embodiment of the invention in which the inflatable cushion is intended for use as a pillow and the air-impermeable skin of the cushion is formed of vinyl, a desired thickness of the vinyl is about 0.3 mm.

The air-impermeable skin preferably includes a nozzle arrangement adapted to engage with the air valve so that the air valve is affixed to the nozzle. The air valve may be affixed to the nozzle arrangement by any suitable fastening means. One preferred fastening means is a simple thread arrangement whereby the air valve is threadably connected to (or disconnected from) the nozzle. The threadable connection may be achieved by the air valve having a threaded surface which is adapted to engage with a corresponding threaded surface of the nozzle, enabling the air valve to be 'screwed' onto and (removeably) secured to the nozzle.

The inflatable cushion of this invention typically has a forward end and a rearward end. In one preferred embodiment, the cushion is thicker at the rearward end than the forward end. In this embodiment, the difference in thickness is generally between about 1 cm and 2 cm.

In a further preferred embodiment, the inflatable cushion may further include a cut-out portion, adjacent the forward end, for receiving the neck or shoulder of a user.

The foam layer on the upper surface of the inflatable body may include a corrugated surface. This corrugated surface may include a series of ridges and channels extending between opposed sides of the foam layer. These corrugations facilitate the movement of air along the channels, thereby enabling ventilation between the head (or other body part) of the user and the cushion.

The inflatable cushion of the present invention may also have corrugations on the foam layer on the lower surface of the inflatable body. Typically, this part of the foam layer rests against the mattress of a bed and, having corrugations located on this part of the foam layer, further enhances the extent of ventilation around the cushion. Of course, having corrugations in the foam layer on both of the upper and lower surfaces makes both surfaces of the relevant cushion more adaptable for direct contact with a part of the user's body.

The above described cushion is preferably adapted to enable the cushion to be inflated to a desired level of a user by operation of the sealable air valve. This enables a user to select between a firm or soft cushion and between a relatively thick or relatively thin cushion, without having to use different cushions.

Similarly, this feature enables a single cushion, or at least a smaller range of cushions, to be used which will satisfy the differing requirements of a range of users (or of the same user at different times). Accordingly, this has significant cost benefits for users, including chiropractors, other health care providers and, ultimately, consumers.

In an alternative embodiment of the invention, the inflatable body may include a plurality of chambers, an elastic foam core within each chamber and a sealable air valve associated with each chamber. These chambers may be independently adjusted to vary the extent of inflation (and therefore the resilience) of each chamber, as desired by a user.

According to a third aspect of the present invention, there is provided a mattress comprising:
 a mattress body; and
 an inflatable cushion, having an inflatable body which includes an air-impermeable skin defining a chamber, an elastic foam core within said chamber and a sealable air valve, said inflatable cushion being positioned within said mattress body;
wherein the sealable air valve is accessible at an external face of said mattress.

Preferably, the inflatable cushion may be locatable at more than one position within said mattress body so that it may underlie a desired portion of a user's body, such as the head, the shoulders, the back, the torso, the hips, the legs or the feet of said user.

It is preferred that the air-impermeable skin is formed of a substance which minimises any rustling sound when a part of a user's body moves on the cushion. In one preferred embodiment, the air-impermeable skin of the cushion is formed of latex rubber. Alternatively, the air-impermeable skin may be formed of vinyl. When the air-impermeable skin of the cushion is formed of vinyl, a desired thickness of the vinyl is about 0.45 mm.

The air-impermeable skin preferably includes a nozzle arrangement adapted to engage with the air valve so that the air valve is affixed to the nozzle. The air valve may be affixed to the nozzle arrangement by any suitable fastening means. One preferred fastening means is a simple thread arrangement whereby the air valve is threadably connected to (or disconnected from) the nozzle. The threadable connection may be achieved by the air valve having a threaded surface which is adapted to engage with a corresponding threaded surface of the nozzle, enabling the air valve to be 'screwed' onto and (removeably) secured to the nozzle.

The mattress body may be formed of foam, pieces of foam, springs or any other materials typically used in the manufacture of mattresses, or a combination of such materials.

In a preferred embodiment of this aspect of the invention, the mattress body includes a cavity adapted to receive the inflatable cushion. Preferably, the cavity has an opening in an upper surface of the mattress body adapted to enable the inflatable cushion to be inserted into the cavity.

In a further preferred embodiment, the mattress body may comprise at least one removeable foam piece and the mattress is adapted so that the positioning of the inflatable cushion and the foam piece may be interchanged. This feature enables a user to change the positioning of the inflatable cushion from, say, beneath the user's head to, say, beneath the user's hips.

The mattress may include more than one inflatable cushion. The mattress may also include more than one removeable foam piece. In a further alternative, the mattress may include one inflatable cushion and two or more removeable foam pieces, in which case the inflatable cushion may be interchanged with any one of the removeable foam pieces, thereby enabling the inflatable foam cushion to be located in any of a plurality of different positions within the mattress.

The elastic foam core of the inflatable cushion may be formed of any suitable foam material. Preferably, the foam material of the foam core has a density of between about 20 kg/m$^3$ and about 35 kg/m$^3$ and a hardness of between about 50 newtons and about 120 newtons. In a particularly preferred embodiment, the foam material of the foam core has a density of between about 25 kg/m$^3$ and about 32 kg/m$^3$ and a hardness of between about 60 newtons and about 110 newtons.

The foam used elsewhere in the mattress (as described above) preferably has a density of between about 30 kg/m$^3$ and about 70 kg/m$^3$ and a hardness of between about 30 newtons and about 100 newtons. It is particularly preferred that this foam has a density of between about 38 kg/m$^3$ and about 60 kg/m$^3$ and a hardness of between about 50 newtons and about 80 newtons.

The foam core and/or the foam used elsewhere in the mattress (as described above) may be formed of visco-elastic foam.

In a further preferred embodiment, the mattress further comprises an external frame positioned around the perimeter of at least a portion of the mattress body. Preferably, the frame extends around the entire perimeter of the mattress. The frame may be formed of any suitable material such as (but not limited to) foam (e.g. a hard foam) or plastic, or a textile material or a combination of these.

The mattress described above may be of any size and/or shape. Typically, the mattress will be a single, double, queen or king sized mattress. Of course the mattress may also be a smaller size for use in a bassinet or a cot (for a baby or infant). Such smaller mattresses may also have applications in other products, such as babies' prams and strollers.

Where the mattress is a two-person mattress, intended for use by two persons (e.g. double, queen and king size), the mattress typically includes a first half for one user and a second half for another user. The two-person mattress may include at least one of the inflatable cushions on just one half of the mattress or on both halves. As is the case with single-bed mattresses, such as those described above, two-person mattresses may include at least one removeable foam piece enabling the positioning of each inflatable cushion and a foam piece to be interchanged.

In the two-person mattress described above, a user on one half of the mattress can have an inflatable cushion positioned under a desired portion of the user's body and at a desired degree of inflation and this will be quite independent of the positioning and degree of inflation of the inflatable cushion on the other half of the mattress.

This enables a range of differing settings of a two-person mattress, adapted to accommodate the different requirements of the two persons.

Also, in respect of a two-person mattress, it is preferred that the mattress will include a separating portion adjacent a centre line of the mattress adapted to separate at least a section of one half of the mattress (for one user) from an adjacent section of the other half of the mattress (for another user). The separating portion may simply comprise a gap between adjacent sections of the mattress halves. Alternatively, the separating portion may comprise a separation strip formed of any appropriate material, such as foam, plastic or a textile material.

In an optional embodiment of this third aspect of the invention, the inflatable cushion of the mattress is an inflatable cushion according to the first aspect of the present invention.

In an alternative optional embodiment of this third aspect of the invention, the inflatable cushion of the mattress is an inflatable cushion according to the second aspect of the present invention.

However, it is preferred that, when the inflatable cushion is intended for use within a mattress and when the air-impermeable skin is formed of vinyl, the thickness of the vinyl is about 0.45 mm.

In a particularly preferred embodiment, the mattress further includes at least one elastic foam layer positioned above the inflatable cushion. Preferably, the elastic foam layer is formed of visco-elastic foam, such as described above. In this preferred embodiment, it is further preferred that there is also at least one layer of latex rubber located above the inflatable cushion. This layer of latex rubber provides a sensation of additional firmness to the mattress. In this preferred embodiment, the layer of latex rubber may be placed directly over the inflatable cushion or it may be placed above a layer of elastic foam (which may be located directly over the inflatable cushion).

In the mattress described above, it is preferred that the sealable air valve of the or each inflatable cushion is accessible at a side face of the mattress. This is to facilitate easy access to, and use of, the air valve by a user.

Accordingly, where the mattress comprises an external frame, the frame includes a hole adapted to enable access to the air valve. The frame may include at least one hole on each side of the mattress. This will enable the inflatable cushion to be inserted in such a way that the air valve is accessible at a desired side of the mattress (e.g. not against a wall).

The mattress may also comprise a covering which, preferably, covers the entire mattress. This covering is typically formed of a textile material. The covering provides the mattress with greater stability and improved ease of handling. Of course, the covering should include a hole adapted to enable access to the air valve.

In another preferred embodiment, the inflatable cushion may have a convex upper surface when inflated. This convex surface may be adapted to extend above the upper surface of the rest of the mattress. This extending convex surface of the inflatable cushion can be used to provide additional support to a desired part of the body (such as the lower back) which may require or benefit by such additional support.

According to another aspect of this invention, there is provided a method of manufacturing an inflatable cushion, according to the first aspect or the second aspect of this invention, said method including:
  forming a cushion having an internal cavity and an opening for accessing the internal cavity;
  inserting the inflatable body into the internal cavity whilst locating the sealable air valve so that it is accessible by an external user; and
  sealing the opening.

According to a further aspect of this invention, there is provided a method of using an inflatable cushion, according to the first aspect or the second aspect of this invention, said method including:
  opening the sealable air valve;
  allowing air to enter the inflatable body up to a desired inflation level; and
  sealing the sealable air valve The air-impermeable skin of the inflatable cushion can be formed of any suitable material including latex rubber or vinyl.

The inflatable cushion can have a forward end and a rearward end, said cushion being thicker at the rearward end than the forward end.

Said cushion can include a cut-out portion, adjacent the forward end, for receiving the neck of a user.

The foam layer on the upper surface of the inflatable body of the inflatable cushion can include a corrugated surface. The corrugated surface can include a series of ridges and channels extending between opposed sides of the foam layer.

Said inflatable cushion can be adapted to enable the cushion to be inflated to a desired level of a user by operation of the sealable air valve.

The inflatable body of the inflatable cushion can include a plurality of chambers, an elastic foam core within each chamber and a sealable air valve associated with each chamber.

According to another further aspect of the invention, there is provided a valve assembly including:
  a valve body having a first end;
  a valve member adapted to seal an opening, the valve member having an open position in which the valve member allows an air passage through the opening, and a closed position in which the valve member seals the opening;
  an actuating means associated with the body and the valve member;
wherein a first actuation of the actuating means causes the valve member to be in the open position, and a second actuation of the actuating means causes the valve member to return to its closed position, wherein the first and second actuation each involve an application of a force upon the actuating means towards the valve member.

The first actuation can cause the actuating means to move from an extended position to a retracted position, and the second actuation can return the actuating means to the extended position.

The actuating means and the valve member can be both biased away from the same end of the body.

The first actuation can cause one of the valve member and the actuation means to rotate by a discrete amount with respect to the other, and the second actuation can cause the one of the valve member and the actuation means to rotate by the same discrete amount and in the same direction with respect to the other.

An interior surface of the body can be profiled so as to keep the valve member in the open position after the first actuation.

One of the interior surface of the body and an exterior surface of the valve member, can be profiled to have evenly spaced longitudinal ribs, there being channels interspersed between the ribs, and the other one of the exterior surface of the valve member and the interior surface of the body can include fins adapted to fit into and move longitudinally relative to the channels.

Every alternate channel can have a raised floor, and the fins can be adapted to fit only into the alternate channels without the raised floors.

The application of the force applied in the first actuation can cause the fins to move longitudinally within and then clear the alternate channels without the raised floors, and upon a release of the force applied in the first actuation, the fins can be biased to re-enter the channels, but are prevented from re-entering the channels by the raised floors.

The ribs and the raised floors of the alternate channels can each have chamfered ends, the chamfered ends of the ribs and the raised floors having a same angle of inclination, and the ends of the fins adjacent the ribs are also chamfered and have the same angle of inclination.

The longitudinal ribs and the channels can be located on the interior surface of the body, and the actuating means can have external ribs adapted to fit into and move relative to the channels.

The external ribs of the actuating means can be profiled to cooperate with a shape of the valve member.

The external ribs of the actuating means can be each chamfered to abut a zigzag formation provided on the valve member.

The valve assembly can have a first biasing means which biases the actuating means in a direction away from the body.

The actuating means can include a shaft which defines a through passage, and the valve member includes a stem that is adapted to be received by the through passage.

The valve assembly can have a second biasing means which biases the valve member in a direction away from the body.

The actuating means can include an actuation surface adjacent the shaft.

The head of the actuation surface can include one or more through apertures.

The actuation surface can include an inner perimeter and an outer perimeter, and the shaft of the actuating means extends from the inner perimeter, the inner perimeter defining an opening into the through passage of the shaft.

The outer perimeter of the shaft can extend into a circumferential flange.

The body can include a housing.

The housing can include a chamber adjacent one end, and the actuating means is at least partially located in the chamber.

The housing can include a chamber associated with the valve member, in which said valve member is at least partially located.

The actuating means can be adapted to be moved relative to said one end.

Said one end can be an open end.

The opening can be provided at a second end of the body, the second end being opposite the first end, wherein in its closed position, the valve member seals the second end of the body, thereby closing the air passage.

The valve member can carry an O-ring adapted to seal the second end of the body.

The opening is provided on a device adapted to be sealed by the valve member.

The valve assembly housing can further include a support flange for supporting the valve assembly on the inflatable body.

According to a still further aspect of the invention, there is provided a valve assembly including:
- a housing having a first chamber extending from a first open end and a second chamber extending from a second open end, said second chamber being in open communication with the first chamber;
- a valve plug, at least a portion of which is located within the second chamber, and which is adapted to seal the second open end;
- a valve actuating means, at least a portion of which is located within the first chamber, wherein said valve plug and said valve actuating means are adapted so that, upon a single push of the valve actuating means, the valve plug moves from a valve-open position to a valve-closed position and upon a subsequent push of the valve actuating means, the valve plug moves from a valve-closed position to a valve-open position.

The valve plug can include a first end, an intermediate section and an aperture sealing end opposed to the first end; and the valve actuation means can include a first end and an opposed exposed end wherein the aperture sealing end of the valve plug is adapted to seal the second open end of said second chamber and the exposed end of the valve actuation means is adapted to be pushed by a user.

The first open end of the first chamber can be opposed to the second open end of the second chamber.

The valve actuating means can include a pushing surface; and the valve plug can include a pushed surface adapted to be pushed by the pushing surface, wherein when the valve actuating means is pushed, the pushing surface of the valve actuating means pushes against the pushed surface of the valve plug.

The first end of the valve actuation means can be located within the second chamber of the housing.

The valve plug can include a plurality of ribs extending radially from the intermediate section; and the valve actuation means can include a plurality of radially extending ribs adjacent said first end; and the second chamber can include an internal surface having a plurality of substantially uniform channels adapted to receive the ribs of the valve plug and the ribs of the valve actuation means.

The channels, the ribs of the valve plug and the ribs of the valve actuation means can be configured so as to enable the ribs to move along said channels when valve actuating means is pushed.

The valve assembly can have a first biasing means adapted to bias the valve actuating means back towards its original position after being pressed by a user.

The channels and the ribs of the valve plug can be configured so that, when the valve plug moves a predetermined distance along the channels the ribs of the valve plug exit the channels and, under the influence of a second biasing means, the valve plug is caused to rotate within the second chamber.

The second biasing means can be adapted to bias the valve plug towards the valve actuation means.

The valve plug can include a set of inclined surfaces positioned between the first end and the intermediate section of the valve plug, and exposed ends of the ribs of the valve actuation means press against said inclined surfaces under the influence of the second biasing means.

The inclined surfaces of the valve plug and the exposed ends of the ribs of the valve actuation means can be adapted so that when, upon pushing of the valve actuation means, the ribs of the valve plug exit the channels, the valve plug is caused to rotate relative to the valve actuation means, under the influence of the second biasing means.

The internal surface of the second chamber can include a set of inclined ledges in between openings of said channels.

The inclined ledges can include adapted to abut the exposed ends of the ribs of the valve actuation means after the valve plug has been caused to rotate and, under the influence of the first biasing means, guide each of the ribs into an adjoining channel of the second chamber.

In order to facilitate the securing of the valve assembly to the impermeable skin of an inflatable pillow or an inflatable cushion, a surface of the valve body may comprise a threaded section. This threaded section is adapted to engage with a corresponding threaded section of a surface of a nozzle arrangement of the impermeable skin so that the valve assembly can be 'screwed' into and secured within the nozzle arrangement.

The invention further provides an inflatable cushion including an inflatable body having a sealable air valve according to the valve assembly described above.

The invention further provides a mattress including at least one inflatable cushion which includes an inflatable body have a sealable air valve according to the valve assembly described above.

BRIEF DESCRIPTION OF THE DRAWINGS

An embodiment or embodiments of the aspects of the present invention will now be described, by way of example only, with reference to the accompanying drawings.

FIG. 3b is an alternate perspective view to that shown in FIG. 3a.

FIGS. 7a to 7d are perspective views of an inflatable cushion according to an alternative preferred embodiment of the first aspect of the present invention.

FIG. 12 is a cross section of the housing of the valve assembly of FIG. 10.

FIG. 13 is a cross section of the actuating means in the valve assembly of FIG. 10.

FIGS. 14A and 14B show lower and upper perspective views of the actuating means of the valve assembly of FIG. 10.

DETAILED DESCRIPTION

A preferred embodiment of the invention will now be described with reference to the above drawings.

The Inflatable Cushion

Figure 1:
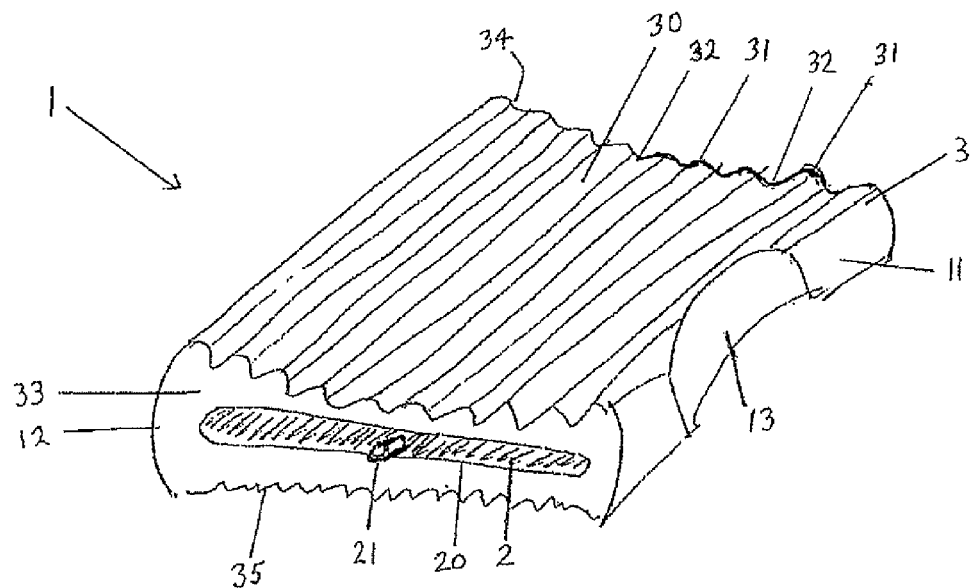
FIG. 1 is a perspective view of an inflatable cushion according to a preferred embodiment of a first aspect of the present invention (with open side), in a deflated formation.
Figure 2:
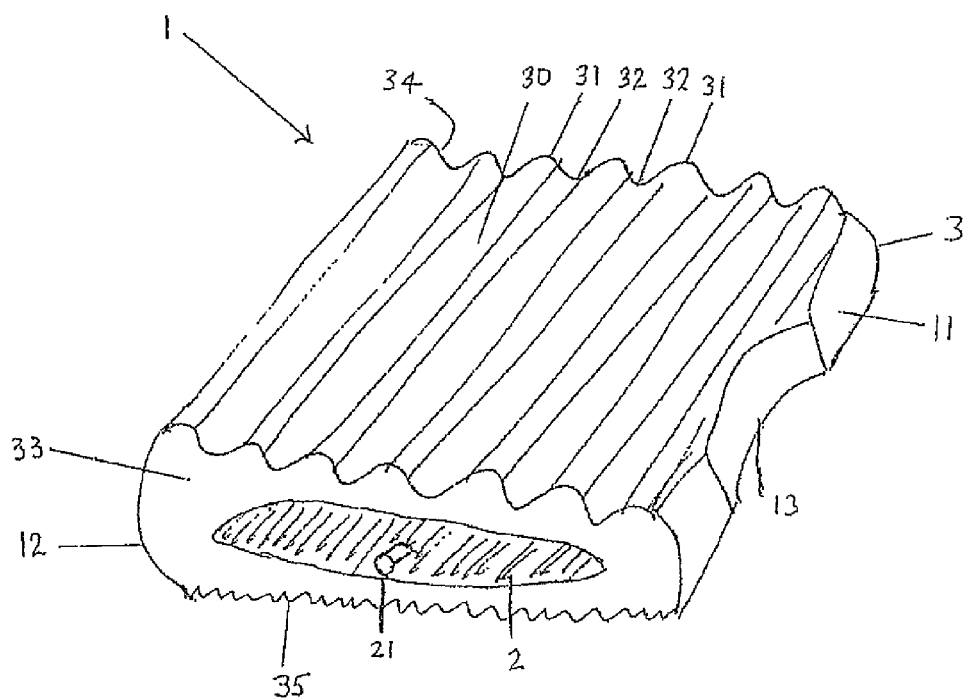
FIG. 2 is a perspective view of the inflatable cushion of FIG. 1, in an inflated formation.
Figure 4:
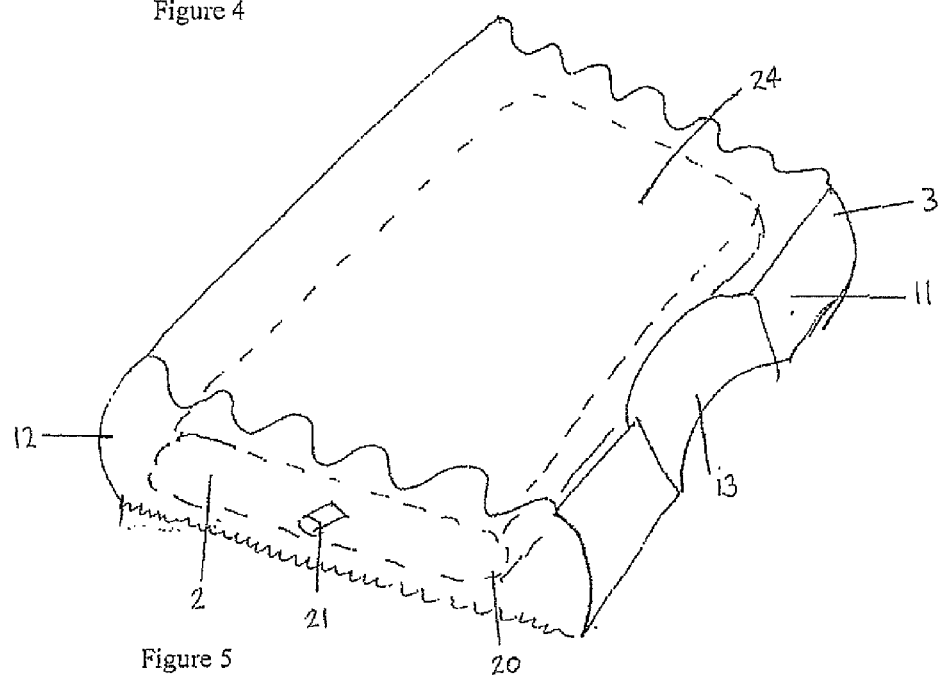
FIG. 4 is a perspective view of the inflatable cushion of FIG. 3 (with closed side) showing internal inflatable body in broken lines.

FIGS. 1, 2 and 4 show an inflatable cushion 1, according to a preferred embodiment of the invention, having an internal inflatable body 2 and an external elastic foam layer 3. The inflatable body 2 has an upper surface 24 (shown in FIG. 6) and a lower surface (not clearly shown in the drawings). The inflatable body 2 also includes an air-impermeable skin 20, which defines an internal chamber, and a sealable air valve 21. This sealable air valve 21 is located at an end of the inflatable body 2 and extends from the side 33 of the cushion 1.

The external elastic foam layer 3 covers the upper and lower surfaces of the inflatable body 2. This foam layer 3 is adhered to these upper and lower surfaces of the inflatable body 2.

An upper portion 30 of the foam layer 3, which covers the upper surface 24 of the inflatable body 2, is corrugated, having a series of ridges 31 and channels 32 which extend transversely between opposed sides 33, 34 of the cushion 1. These ridges 31 and channels 32 facilitate ventilation between a user's head (or other body part) and the cushion 1.

A lower portion 35 of the foam layer 3, which covers the lower surface of the inflatable body 2, is also corrugated, having a series of smaller ridges and channels which, again, extend transversely between opposed sides 33, 34 of the cushion 1. These ridges and channels facilitate ventilation around the pillow.

The cushion 1 has a forward end 11 and a rearward end 12. The rearward end 12 is slightly thicker than the forward end 11, typically by about 1.5 cm. The forward end 11 also includes a cut-out section 13 adapted to receive the neck or shoulder of a user.

Figure 3A:
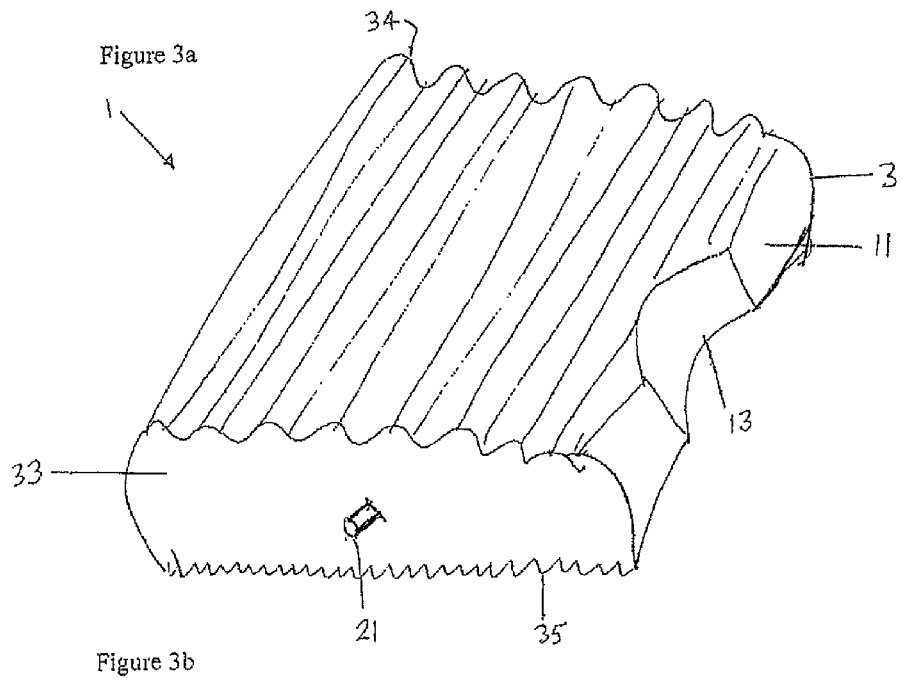
FIG. 3a is a perspective view of the inflatable cushion of FIG. 2 (with closed side).
Figure 3B:
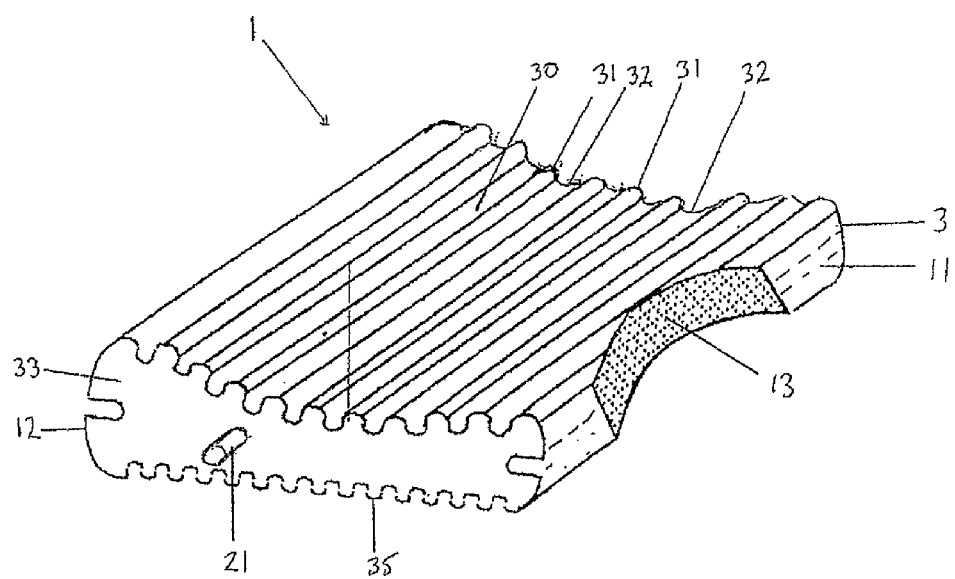

FIG. 3a shows the above described cushion 1 also having a foam side panel 14. Preferably, both sides of the cushion 1 have side panels 14. These side panels effectively close the cushion 1 and retain the inflatable body 2 within the external foam layer 3. In this embodiment, the sealable air valve 21 extends through an aperture in the adjoining side panel 14.

FIG. 4 shows the above inflatable cushion 1 with the inflatable body 2 in position (shown in broken lines) surrounded by the elastic foam layer 3.

Figure 5:
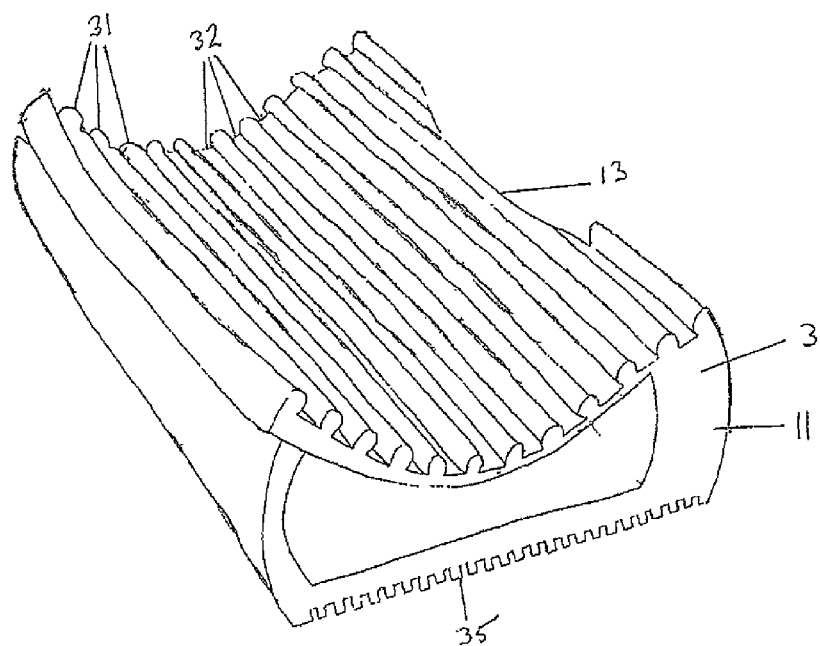
FIG. 5 is a perspective view of the inflatable cushion of FIG. 1, with the internal inflatable body removed.

FIG. 5 shows the above inflatable cushion 1 (without side panel 14) prior to insertion of the inflatable body 2.

Figure 6:
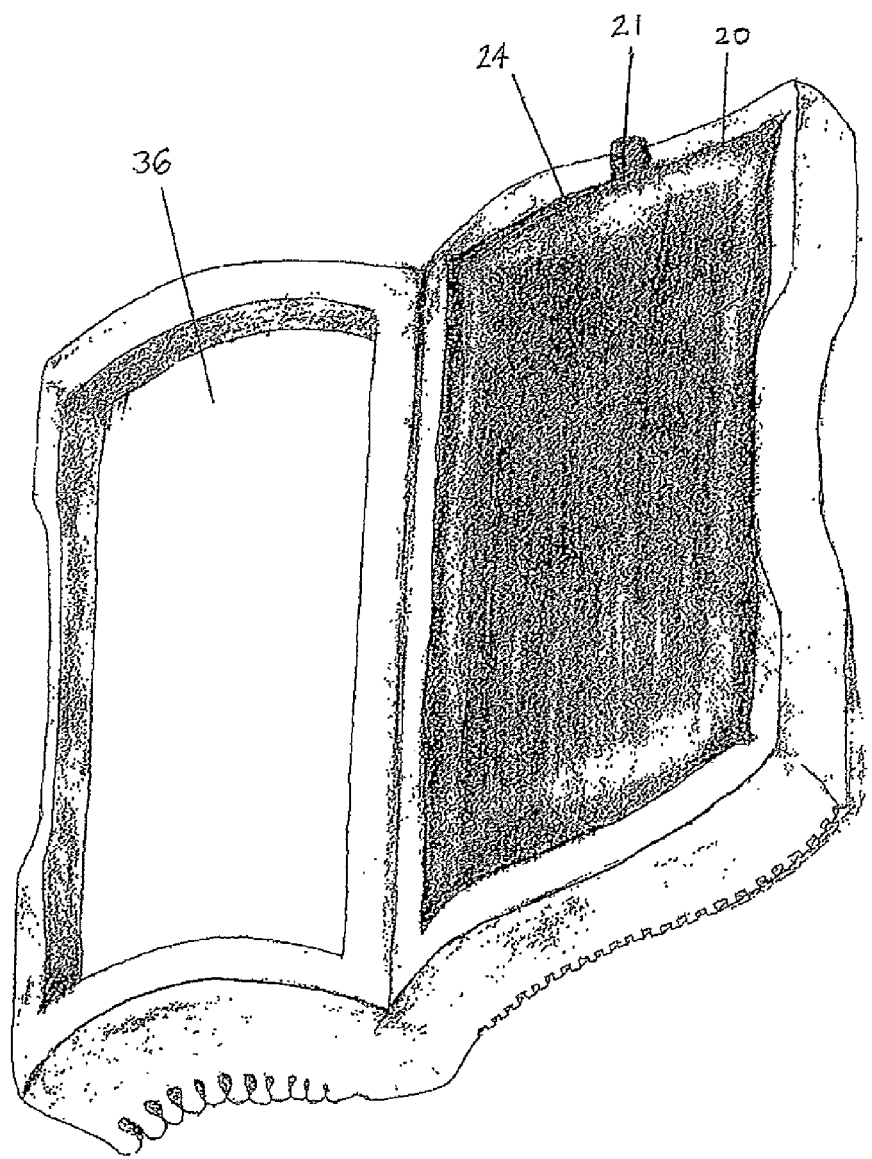
FIG. 6 is a perspective view of the inflatable cushion of FIG. 1, with the internal inflatable body in position, prior to the closing up of the cushion (during manufacture).

FIG. 6 shows the above inflatable cushion 1, during the manufacture of same, after insertion of the inflatable body 2 into position, but prior to closure of the cushion. The lower surface of the inflatable body 2 is adhered to an adjoining surface of the foam layer 3. The cushion is then closed and the upper surface 24 of the inflatable body 2 is then adhered to an adjoining surface of the foam layer 3.

FIGS. 7a to 7d show an alternative preferred embodiment of the inflatable cushion 1. In this embodiment, only one face, being the upper face, of the cushion has corrugations for providing improved air flow around the vicinity of a user's head. The opposite face, being the lower face, is substantially flat.

FIGS. 7a, 7b and 7d show side faces of the inflatable cushion comprising foam walls having an aperture 121 adapted to enable a portion of the valve assembly to extend through. FIG. 7c shows a portion (being an actuating portion) of the valve assembly located outside the aperture 121.

Figure 8A:
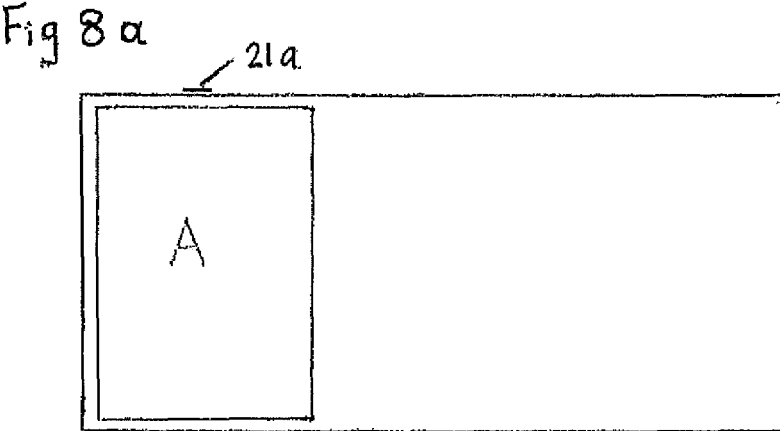
FIGS. 8a to 8c are schematic representations of mattresses, showing different orientations of components thereof, according to preferred embodiments of a further aspect of the present invention.
Figure 8B:
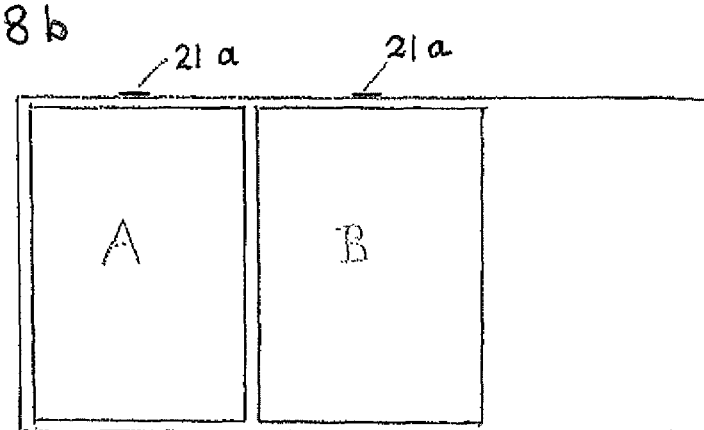
Figure 8C:
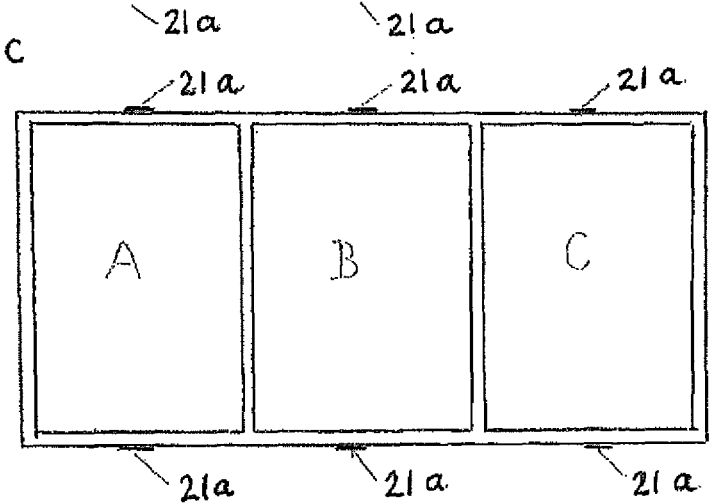

FIGS. 8a to 8c show schematic representations of a single-bed mattress having portions: A; A and B; or A, B and C. These portions represent positions in which an inflatable cushion (such as described above) may be located.

In FIG. 8a, the inflatable cushion is located in position A, being the only available position.

In FIG. 8b, the inflatable cushion may be located in position A or position B. When in either of these positions, a removeable foam piece is generally located in the other position. Alternatively, inflatable cushions could be placed in both positions A and B.

In FIG. 8c, the inflatable cushion may be located in position A, position B or position C. When in one of these positions, a removeable foam piece is typically located in each of the other positions. Alternatively, inflatable cushions could be placed in one or both of these other positions.

Figure 9A:
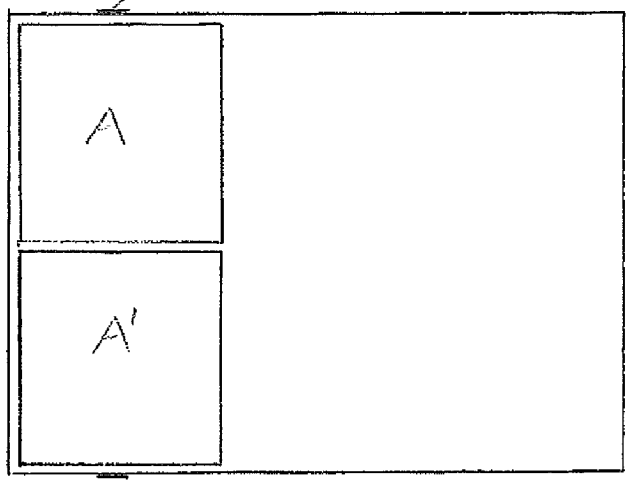
FIGS. 9a to 9c are schematic representations of mattresses, showing different orientations of components thereof, according to alternative preferred embodiments of the further aspect of the present invention.
Figure 9B:
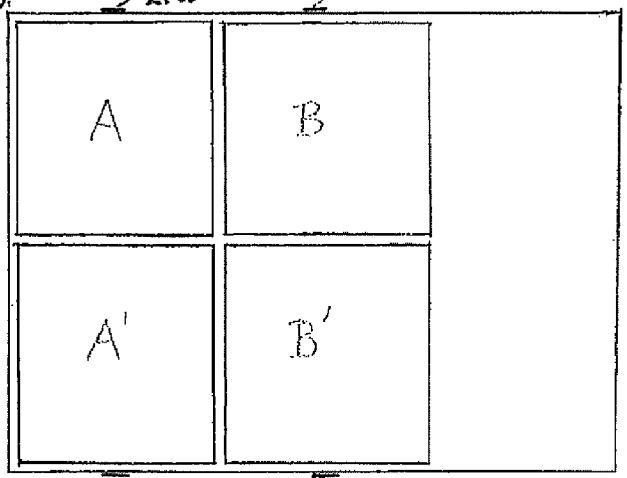
Figure 9C:
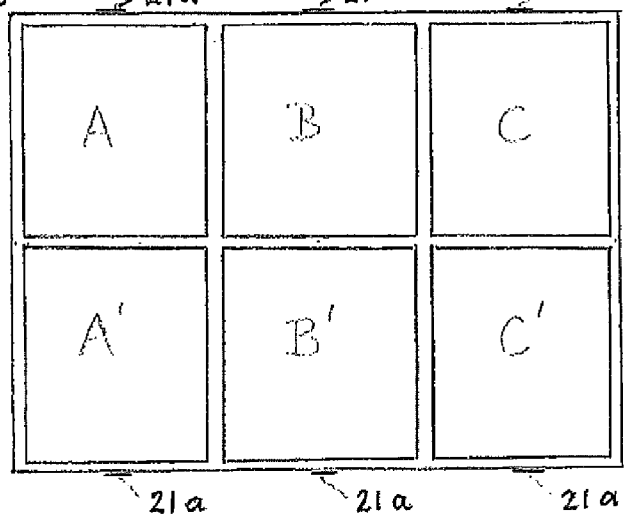

FIGS. 9a to 9c show schematic representations of a two-person mattress having portions: A and A'; A, A', B and B'; or A, A', B, B', C and C'. These portions represent positions in which an inflatable cushion (such as described above) may be located. Generally, a two-person mattress will be made symmetrically in the sense that an equal number of portions, for location of the inflatable cushion, will be formed on each half of the mattress.

In FIG. 9a, the inflatable cushions are located in positions A and/or A', being the only available positions.

In FIG. 9b, the inflatable cushions may be located in one or more of the positions A, A', B and/or B'. When in any of these positions, a removeable foam piece is typically located in the other position(s).

In FIG. 9c, the inflatable cushion may be located in one or more of the positions A, A', B, B', C and/or C'. When in any of these positions, a removeable foam piece is typically located in the other position(s).

FIGS. 8a to 8c also show the location 21a of the actuating portion of the valve assembly of the inflatable cushion (when said cushion is located at the adjoining position).

The Valve Assembly

FIGS. 10 to 13 depict a valve assembly (or a part thereof) for use with the inflatable cushion described above. For ease of reference, the end of the valve assembly which is located on the outside of the cushion will be referred to as the upper or outer end, and the opposite end will be referred to as the lower or inner end.

Figure 10:
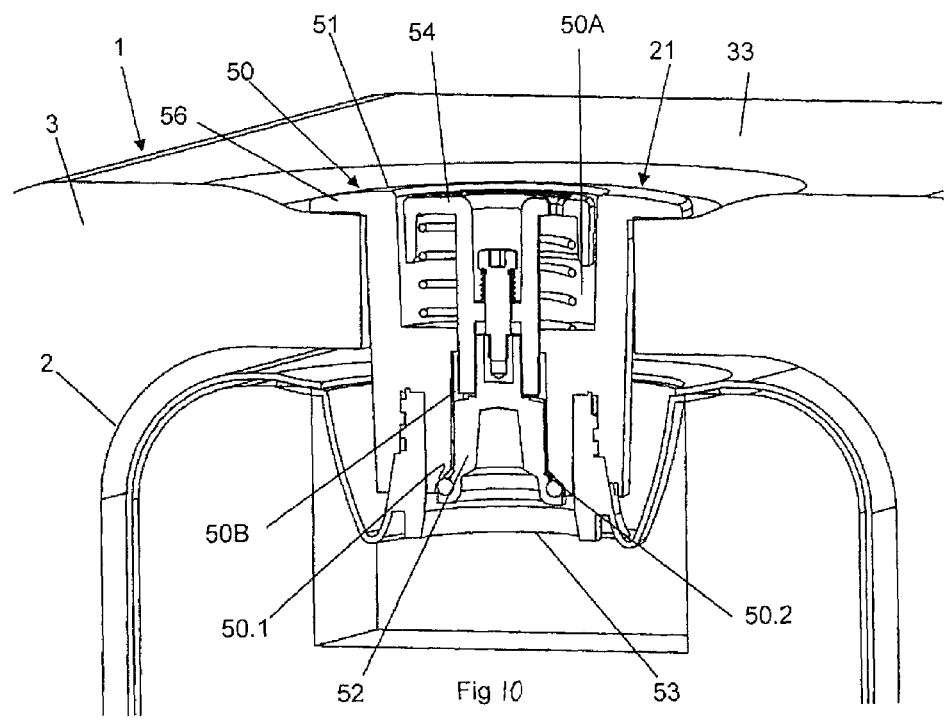
FIG. 10 is a sectional view in perspective, of a valve assembly, according to a preferred embodiment of another further aspect of the present invention, fitted onto the inflatable cushion of any one of FIGS. 1 to 7.

With reference to FIG. 10, the valve assembly 21 includes a body or housing 50 that is supported on the side 33 of the cushion 1, and also by the inflatable body 2. The housing 50 contains and supports a valve plug or valve member 52 which engages a valve seat 50.1 provided around an opening 50.2, to open and close the airflow path between the outside of the cushion 1 and the inflatable body 2. The valve member 52 is moved by an actuating means 54 which is user accessible from outside the cushion 1. In the drawings the actuating means 54 is shown as a push button. However it is understood that other actuating means 54 may be used.

The housing 50 is open ended, having a first open end 51 that is adjacent to the exterior of the cushion 1. An opposite second open end 53 is located toward the interior of the cushion 1. A first chamber 50A extends from the first open end, and a second chamber 50B extends from the second open end, the two chambers being in open communication with each other. The actuating means 54 is partially located in the first chamber, and the valve 52 is partially located in the second chamber.

Figure 11:
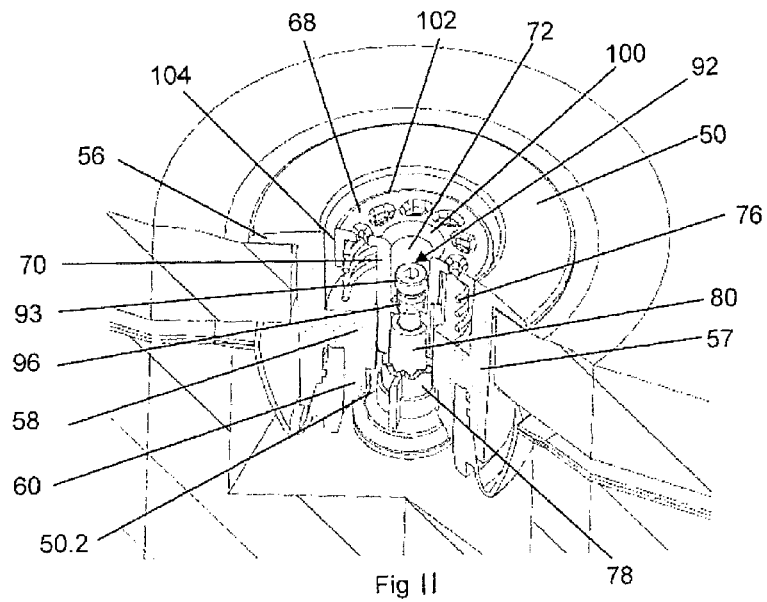
FIG. 11 is a perspective view in section, of the valve assembly of FIG. 10.

As shown in FIGS. 10 and 11, the housing 50 has a generally cylindrical main body 57 and a flange 56 which is provided around the first open end 51 of the housing 50.

When assembled the flange 56 is supported by the outside surface of the cushion 1. The main body 51 is sized to fit into an opening in the cushion which accommodates the valve assembly 51. The outer diameter of the flange 56 is larger than the diameter of the opening in the cushion 1, thereby supporting the housing 50 on the external elastic foam layer 3. The lower portion of the inside surface of the main body 51 is threaded. As will be described, this is to help secure the housing 50 onto a neck which is supported on the internal inflatable body 2 of the cushion 1.

The housing 50 also includes an interior wall 58 which extends transversely into the interior of the housing 50. The interior wall 58 is located between the free ends of the main body 51, and can be considered as dividing the housing 50 into its first and second chambers 50A and 50B. The interior wall 58 extends from the inside wall of the main body 51, into a longitudinal interior tube 60.

Figure 23:
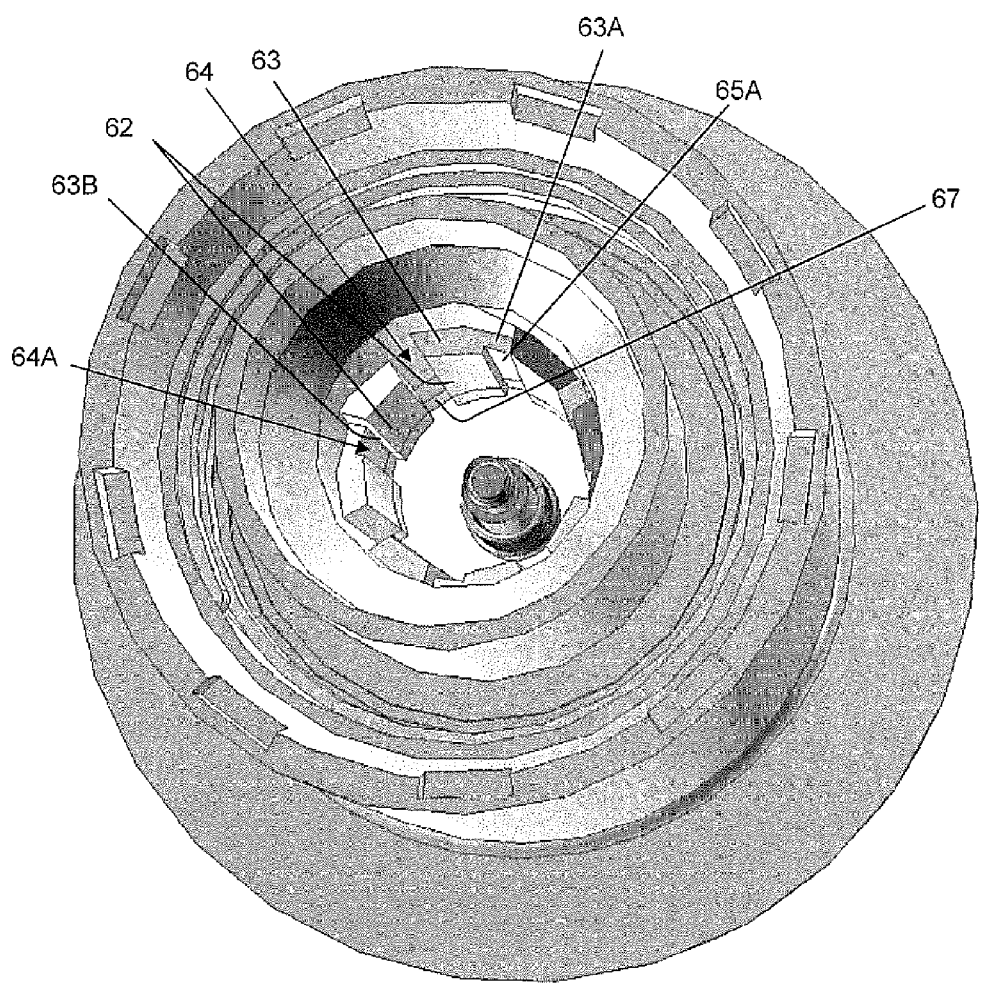
FIG. 23 is a bottom perspective view of the housing and the actuating means of the valve assembly of FIG. 10.

As shown in FIGS. 12 and 23, the tube 60 has a plurality of, in this case eight, ribs 62 provided along its internal surface. The ribs 62 are evenly spaced apart, so that a plurality of grooves or channels 64 and 64A are interspersed between the ribs 62. Each of the ribs 62 has a chamfered or bevelled lower edge 63. The plurality of channels include the same number of deeper channels 64 and shallower channels (or "obstructed channels") 64A which are alternately arranged. Every other channel is a shallower channel 64A that has a floor 65A (best seen in FIG. 20) that is raised with respect to the internal surface of the tube 60. The raised floor 65A also has a lower end 63A that is chamfered to the same angle as the lower edges 63 of the ribs 62. Therefore, the channels 64 alternate between having a raised end chamfered base and not having a raised and chamfered base. The ribs 62 extend through the whole length of the tube 60 but this is a preferment. The internal wall of the tube 60 gradually thins out toward the lower end of the tube 60, so as to provide the valve seat 50.1

As best seen in FIG. 23, the housing 50 can optionally include formations 67 extending radially from the internal surface of the tube 60. The formations 67 are located in the alternate deeper channels 64, and are located adjacent the first housing chamber 50A. In use, the formations 67 help guide and centre the actuating means 54 with respect to the housing 50, so that the actuating means can better maintain its central location as it travels in the channels 64 and 64A. As will be explained, the deeper channels 64 are provided so that fins 86 provided on the valve member 52 can travel longitudinally within these channels. Therefore, the deeper channels 64 need to have sufficient length to allow the movements of the valve member 52 in closing and opening the valve assembly. In embodiments where the formations 67 are provided, the deeper channels 64 need to have sufficient length to allow a full range of the movement of the valve member and also accommodate the formations.

FIGS. 13, 14A and 14B depict the actuating means 54 in more detail. The actuating means 54 has a head 68. The head 68 in this embodiment has an annular shape, with an inner perimeter 100 and an outer perimeter 102. In other embodiments the head 68 can assume a different configuration. A downwardly depending skirt 104 extends from the outer perimeter 102 and toward the interior of the cushion 1 (not shown). A shaft 70 extends from the inner perimeter 100. The shaft 70 and skirt 104 are approximately perpendicular to the annular head 68. The inner perimeter 100 defines an opening for the central through hole 72 that runs through the shaft 70. One or more apertures or holes 74 are provided around the inner perimeter 100 and through the head 68.

A flange 73 extends transversely from the inside surface of the shaft 70 into the central through hole 72. As will be explained later the flange 73 serves to partially narrow or restrict the central through hole or passage 72. Structures other than a flange can be used. For instance, a plurality of stubs or arcs, or the like, which extend transversely into the through hole or passage 72 can be used. The outside surface of the shaft 70 has a series of axially extending, circumferentially located, ribs 103. As will be explained later, the shaft 70 is sized to fit into the tube 60 of the housing 50. The ribs 103 on the shaft 70 are dimensioned to slide freely in all of the channels 64 and 64A formed into the inside surface of the tube 60. When assembled, the head 68 of the actuating button 54 is located within the first chamber 50A of the housing 50. A spring 76 (shown in FIG. 8) is provided around the shaft 70, and has one end which is held within the space defined between the outer circumference of the shaft 70 and the inner circumference of the flange 104. In use, the spring bias is held between the head 68 of the actuating button 54 and the interior wall 58 of the housing 50.

Figure 15:
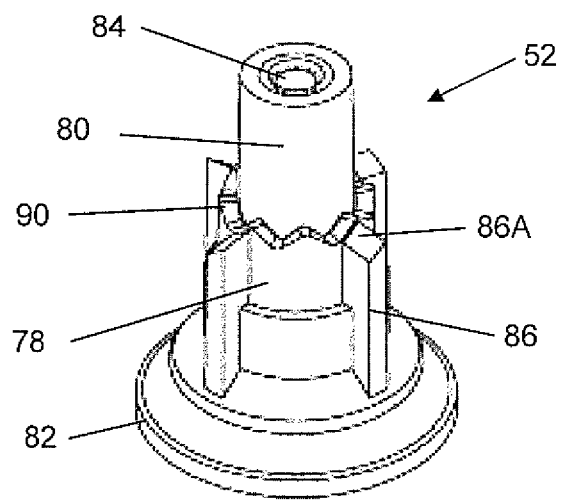
FIG. 15 is a perspective view of the valve in the valve assembly of FIG. 10.
Figure 16:
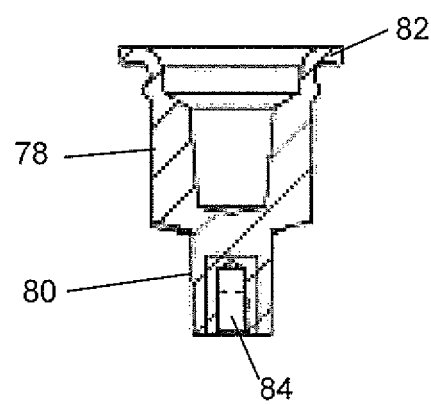
FIG. 16 is cross section of the valve of FIG. 15.

FIGS. 15 and 16 depict the valve member (or "valve plug") 52. The valve member 52 includes a clicker formation 78. One end of the clicker formation 78 extends axially from a stem 80 that is smaller in diameter than the clicker formation 78. The stem 80 has a blind hole 84. This blind hole 84 is threaded, and is located through the end of the stem 80 that is located away from the clicker formation 78. The opposite end of the clicker formation 78 includes a circumferential skirt 82 provided around the perimeter of that end of the clicker formation 78. The skirt can be angled and so flares outwardly from the clicker formation 78. However the skirt 82 does not need to be angled.

The clicker formation 78 has a plurality of, in this case four, axially extending and evenly spaced, exterior fins 86 which are evenly spaced around the stem 80. There are half as many fins 86 as there are internal ribs 62 in the housing 50. Each fin 86 extends generally axially along the base of the stem 80. The free end of each fin 86 also has a chamfered or inclined surface 86A, which is chamfered to the same angle as the chamfered edges 63 of the housing 50. A zigzag or sinusoidal formation 90 is formed around the stem 80 of the valve member 52 and located adjacent to the clicker formation 78. Each alternate surface of the zigzag formation 90 is also chamfered to approximately the same angle as the inclined surfaces of the fins 86. Referring to each rising and falling surface of the zigzag formation 90 as a tooth, there are twice as many teeth in the zigzag or sinusoidal formation 90 as there are fins 86 on the clicker formation 78. Said another way, there are as many teeth in formation 90, as internal ribs 62.

Referring again to FIG. 11, the clicker formation 78 is sized to fit into the tube 60 of the housing 50. The fins 86 are sized to slide freely in the deeper channels 64, but cannot fit into the shallower channels 64A. The stem 80 is sized to fit through the interior wall 58 and extends into the central through hole 72 of the shaft 70 of the actuating means 54, so that the ends 55 of the ribs 103 on the shaft 70 abut the zigzag formation 90 on the clicker formation 78.

Figure 17:
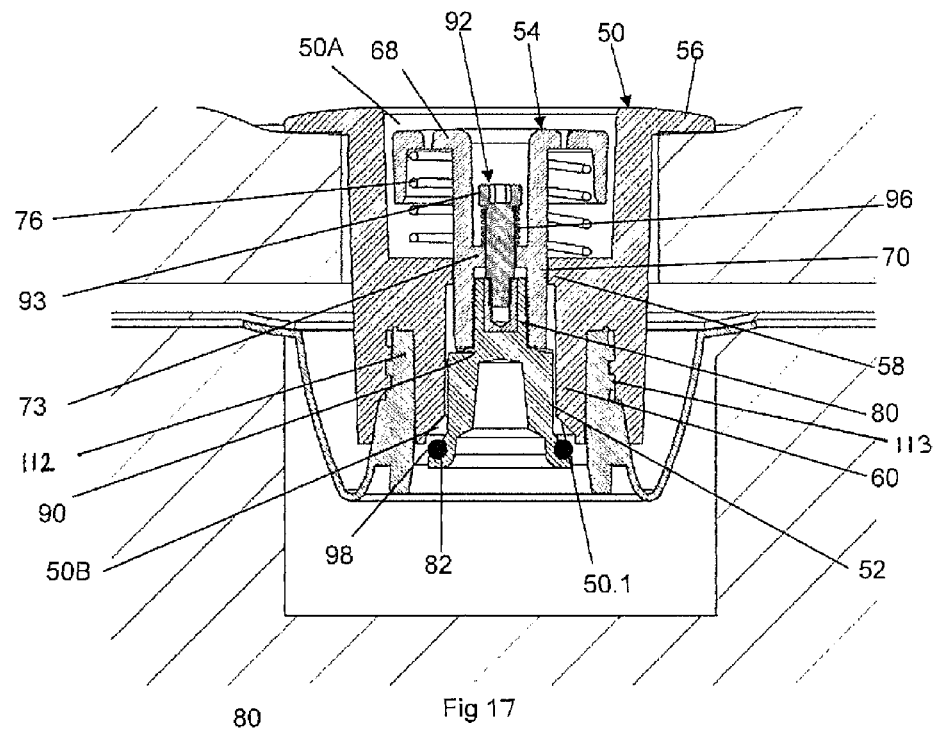
FIG. 17 is cross section of the valve assembly of FIG. 7, positioned within an inflatable cushion of FIG. 7, with the valve in the open position.

As shown in FIGS. 12, 17, 18, 19 and 20, the valve body 50 includes an annular cavity 110 having a threaded wall 111. This annular cavity 110 is adapted to receive an annular nozzle 112 of the air-impermeable skin of an inflatable pillow or cushion. The annular nozzle 112 includes a threaded surface 113, as shown in FIG. 17.

Assembly of the Valve Components

Referring to FIG. 17, when the components are assembled, the actuating button 54 is at least partially located in the first chamber 50A of the housing 50. The head 68 of the actuating button 54 fits within the space defined by the flange 56 of the housing 50. The shaft 70 of the actuating button 54 fits through the interior wall 58 and into the tube 60 of the housing main body 51. The valve member 52 is inserted into the main housing after the actuating means 54 has been appropriately positioned in the housing 50. The shaft 70 of the actuating means 54 fits through the intermediate housing interior wall 58, i.e. the outer dimension of the shaft 70 of the actuating means 54 is the same as the inner dimension of the housing interior wall 58. Also, the shaft of the screw 92 seals the intermediate ring 73 of the actuating means 54.

The valve stem 80 (i.e. first end of the valve) is accommodated in the central through hole 72 of the shaft 70, and the opposed end of the valve member 52 seals the second chamber 50B of the housing 50 by engaging the valve seat 50.1. The ribbed end 55 of the shaft 70 abuts and engages zigzag formation 90 on the clicker formation 78. The shaft's ribbed end 55 is considered a pushing surface of the actuating means 54, and the zigzag or sinusoidal formation 90 is considered a pushed surface of the valve member 52. The tension spring 76 is biased between the head 68 of the button 54 and the interior wall 58 of the housing 50.

The screw 92 fits through the central through hole 72 of the actuating means 54 and is received by the blind hole 84 in the valve stem 80. Only the shaft of the screw 92 is dimensioned to fit through the ring 73 provided inside the actuating means 54. The head 93 of the screw 92 is larger in diameter than the inner diameter of the ring 73 and cannot pass through the ring. A second tension spring 96 is provided around the shaft of the screw and tensioned between the ring 73 and the enlarged head 93 of the screw. The screw 92 can be a shoulder screw, where the threaded portion of the shoulder screw engages the internal thread of the blind hole 84 of the valve stem 80. The second tension spring 96 is provided around the shaft of the shoulder screw, and the shoulder indirectly engages the ring 73 via the second spring 96.

The larger spring 76 provided around the shaft 70 of the actuating means 54 biases the actuating means 54 toward the outside of the cushion. The second and smaller spring 96 biases the valve 52, toward the first chamber 50A.

The Air Path

In use, an O-ring 98 is provided around the base of the valve member 52, so that it is retained between the skirt 82 of the valve member 52 and the valve seat 50.1. The bias of the second spring 96 urges the valve member 52 to close the opening 50.2 by pushing the O-ring 98 onto the valve seat 50.1. When the valve member 52 is in its closed position, the skirt 82 presses against the O-ring 98, which is in turn pressed against the valve seat 50.1, sealing off the air pathway between the inflatable cushion body and the outside.

Figure 18:
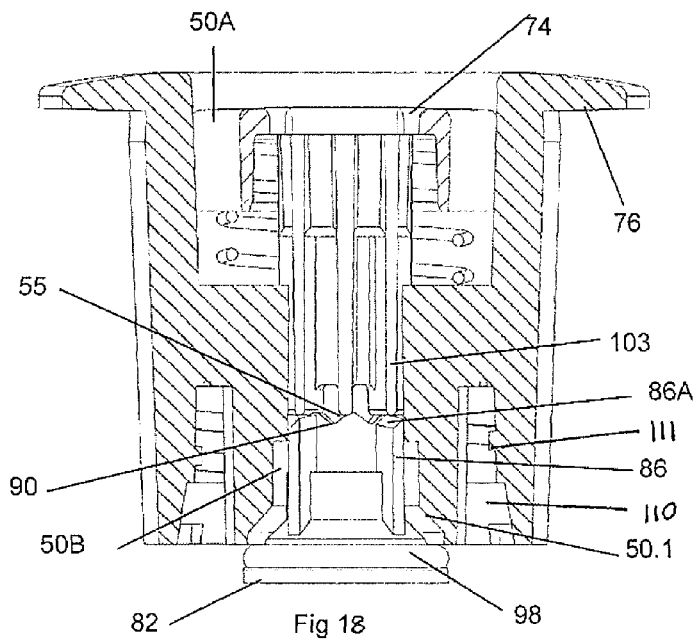
FIG. 18 is cross section of the valve assembly of FIG. 10, with the valve in the open position.
Figure 20:
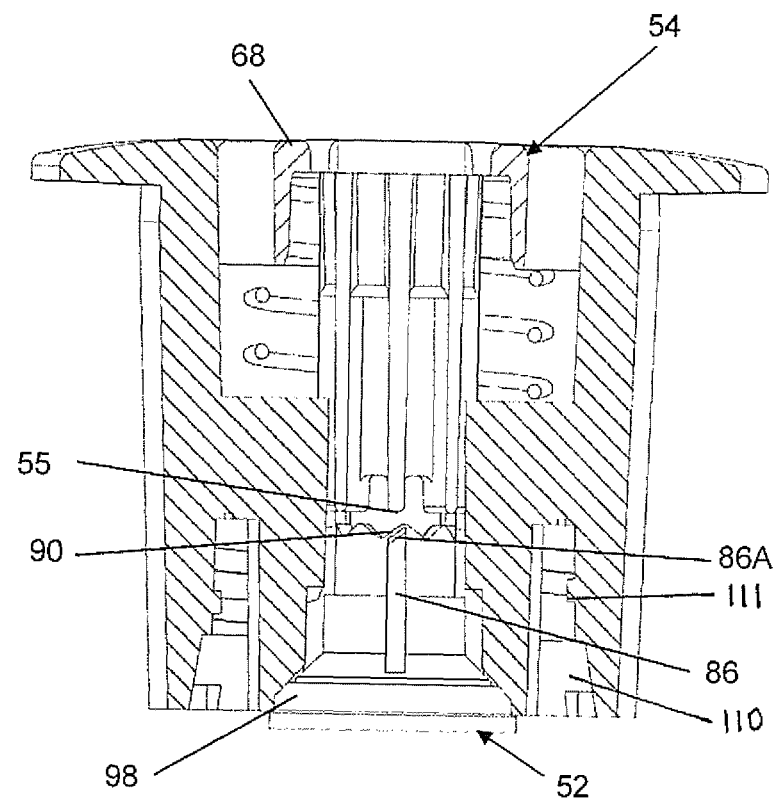
FIG. 20 is a cross section of the valve assembly of FIG. 10, with the valve in the closed position.

With reference to FIGS. 18 and 20, air can enter the holes 74 in the actuating means 54, and then enter the second chamber 50B via the space provided between the exterior ribs 103 of the actuating means 54. The second chamber 50B is sealed by the O-ring 98 when the valve 52 is in the closed position. When the valve 52 is in the open position the second chamber 50B is unsealed, allowing air to enter into the cushion to inflate the cushion.

Operation of the Valve Assembly

As shown in FIGS. 17 to 20, to open the valve 52 so as to allow the cushion to inflate, the user pushes on the actuating means 54 once, to move the actuating means 54 from an extended position (see FIG. 17) into a retracted position (see FIG. 15). As the actuating means 54 is pushed toward the second chamber 50B, the head 68 of the actuating means 54 compresses the first biasing means 76. Also the intermediate ring 73 of the actuating means 54 is moved toward the second chamber 50B, permitting the second biasing means 96 provided around the screw 92 to expand.

As the second biasing means 96 expands, it biases the valve member 52 toward the first chamber 50A, causing the zigzag formation 90 of the valve 52 to abut the ribbed end 55 of the actuating means 54. At this point, the user has not released the actuating means 54, therefore an actuation force is still applied upon the actuating means 54. The ribbed end (i.e. pushing surface) 55, moved by the actuation force, pushes on the zigzag pattern or formation 90 (i.e. pushed surface) 90 of the valve 52. The valve fins 86 are therefore pushed to exit the deeper interior channels 64 in the housing 50. As the valve fins 86 exit the channels 64, the valve 52 is permitted to move in a direction away from the first chamber 50A. The valve skirt 82, and hence the O-ring 98, are therefore moved away from the valve seat 50.1, thereby unsealing the opening 50.2 and thus the air path into the cushion.

The ends 55 of the ribs 103 of the actuating means 54 have a chamfered or bevelled profile, and the zigzag formation 90 which includes a similarly inclined surface. Therefore as the ribbed ends 55 contact the zigzag formation 90, they tend to slide down, and around, the inclined surface of the zigzag formation 90. This movement causes the valve 52 and the actuating means 54 to slightly rotate with respect to each other. This first slight rotation does not occur whilst the fins 86 of the valve member 52 are constrained by the walls of the housing's channels 64. Upon the fins 86 existing the channels 64, however, the valve member 52 is permitted to rotate by an amount that allows the ribs 103 to travel down and around one inclined surface of the zigzag formation 90.

Upon a release of the actuation force by the user, the first biasing means 76 biases the actuating means 54 to return toward the first chamber 50A. The valve member 52 is carried by the actuating means 54 because the head of the screw 92 is carried by the actuating means 54. Therefore the valve 52 also tends to return toward the direction of the first chamber 50A.

Figure 19:
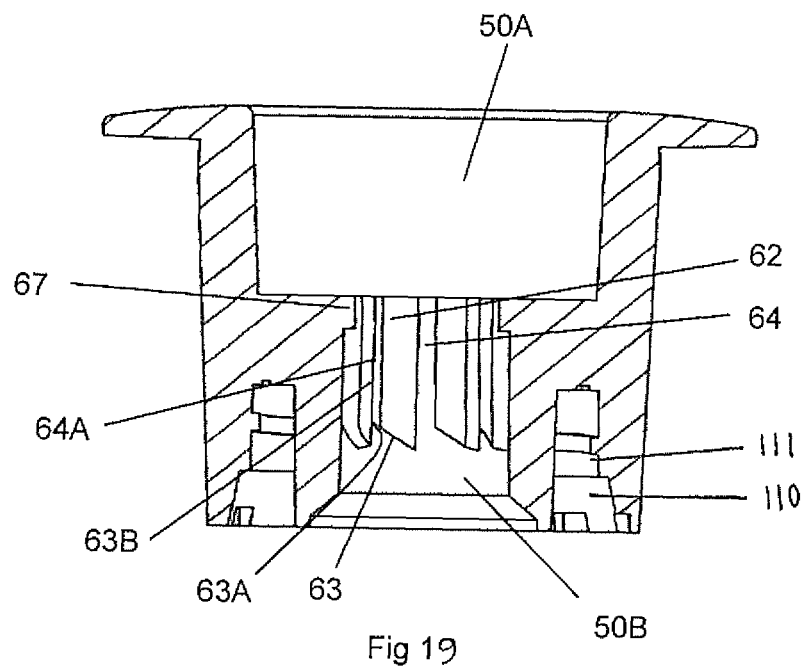
FIG. 19 is a cross section of the housing of the valve assembly of FIG. 10.

With reference to FIG. 19, as the return motion of the valve member 52 is initiated by a pushing force, the inclined surfaces 86A of the valve fins 86 abut and travel along the inclined edges 63 of the housing ribs 62. The travel continues as the valve fins 86 move along the raised floors 63A of the shallower channels 64A. The valve fins 86 cannot re-enter the shallower channels 64A as they are blocked by the raised floors 63A. The movement of the fins 86 is then stopped by the sidewall 63B of the shallower channels 64A. Therefore, the valve member 52 rotates, whilst inclined surface 86A travels along the inclined edges 63, 63A of the housing ribs 62 and the shallower channels 64A, with respect to the actuating means 54. The rotation is stopped when the movement of the valve fins 86 is stopped. As the fins 86 cannot enter the shallower channels 64A, the valve member 52 is retained in its open position. Consequently, the actuating means 54 is retained in a retracted position.

Figure 21:
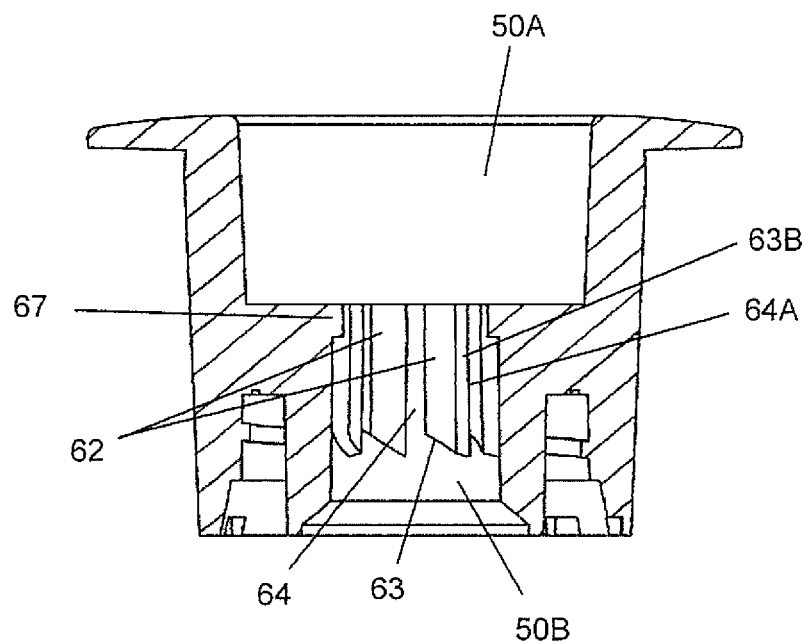
FIG. 21 is a cross section of the housing of the valve assembly of FIG. 10.
Figure 22:
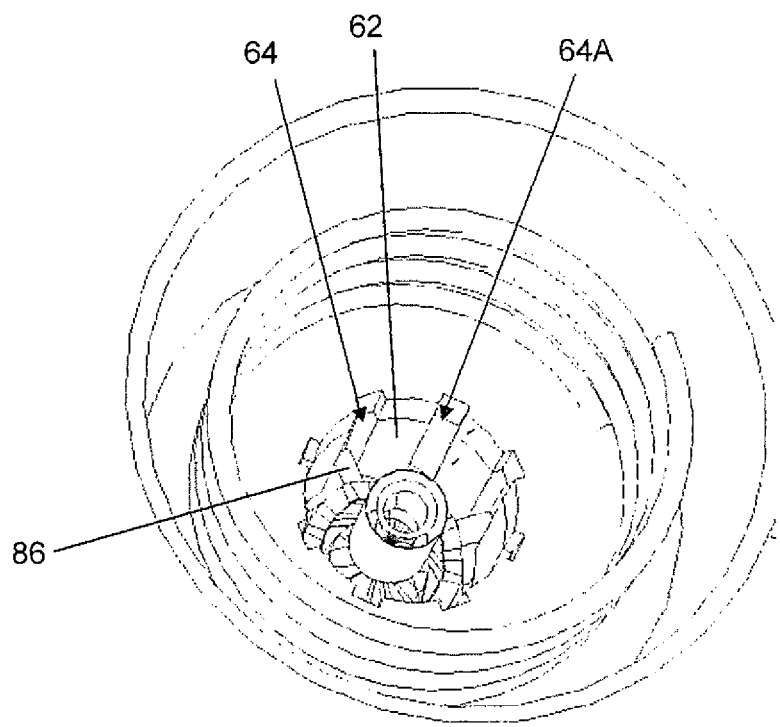
FIG. 22 is a partial perspective view of the housing, the valve, and the first biasing means of the valve assembly of FIG. 10.

As shown in FIGS. 20 and 21, to close the valve member 52 the user applies a second actuation force on the actuating means 54. Again, the same actions which lead to first relative rotational movement of the valve 52 are repeated, consequently there is a second relative rotational movement of the valve 52. Also the valve fins 86 are now pushed down sufficiently so as to be clear of the internal ribs 62 of the housing 50. The inclined surface 86A of the valve fins 86 now clear the obstructing sidewalls 63B of the shallower channels 64A.

When the user releases the actuating means 54, again the valve member 52 tends to return toward the first chamber 50A. As the valve member 52 returns, the inclined surfaces 86A of the valve fins travel along the inclined edge 63 of the housing ribs 62. The valve member 52 therefore rotates with respect to the actuating means 54 and housing 50 again. The rotation is stopped when the fins 86 enter the deeper channels 64 (also shown in FIG. 19), at which point the valve 52 is permitted to return fully to its closed position where the O-ring 98 (not shown) engages the valve seat 50.1 to seal of the air path. The actuating means 54 therefore is also returned to its fully extended position.

In the above description, the valve member 52 is described as having external fins 86 so as to cooperate with the internal channels 64 and 64A of the housing 50. However the invention will work with a housing that has internal fins which cooperate with external grooves or channels provided on the valve member.

The valve member 52 and actuating means 54 can be supported by a body which includes a housing, or by any other body which includes appropriate structure to support the valve member 52 or the actuating means 54.

Modifications and improvements to the invention will be readily apparent to those skilled in the art. Such modifications and improvements are intended to be within the scope of this invention.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:
1. A valve assembly including:
 a housing having a first chamber extending from a first open end and a second chamber extending from a second open end, said second chamber being in open communication with the first chamber;
 a valve plug, at least a portion of which is located within the second chamber, and which is adapted to seal the second open end, wherein the valve plug includes a plurality of ribs extending radially from an intermediate section;

a valve actuator, at least a portion of which is located within the first chamber, wherein the valve actuator includes a plurality of radially extending ribs adjacent a first end of the valve plug; and a first biasing means adapted to bias the valve actuator back towards its original position after being pressed by a user;

wherein said valve plug and said valve actuator are adapted so that, upon a single push of the valve actuator, the valve plug moves from a valve-open position to a valve-closed position and upon a subsequent push of the valve actuator, the valve plug moves from a valve-closed position to a valve-open position;

wherein the second chamber includes an internal surface having a plurality of substantially uniform channels adapted to receive the ribs of the valve plug and the ribs of the valve actuator;

wherein the channels, the ribs of the valve plug and the ribs of the valve actuator are configured so as to enable the ribs to move along said channels when valve actuator is pushed; and wherein the channels and the ribs of the valve plug are configured so that, when the valve plug moves a predetermined distance along the channels, the ribs of the valve plug exit the channels and the valve plug is caused to rotate within the second chamber under the influence of a second biasing means.

2. A valve assembly according to claim 1, wherein:
the valve plug further includes an aperture sealing end opposed to the first end; and
the valve actuator includes a first end and an opposed exposed end, wherein the aperture sealing end of the valve plug is adapted to seal the second open end of said second chamber and the exposed end of the valve actuator is adapted to be pushed by the user.

3. A valve assembly according to claim 1, wherein:
the first open end of the first chamber is opposed to the second open end of the second chamber.

4. A valve assembly according to claim 1, wherein:
the valve actuator includes pushing surface;
the valve plug includes a surface adapted to be pushed by the pushing surface when the valve actuator is pushed.

5. A valve assembly according to claim 1, wherein:
the valve actuator has a first end located within the second chamber of the housing.

6. A valve assembly according to claim 1, wherein:
the second biasing means is adapted to bias the valve plug towards the valve actuator.

7. A valve assembly according to claim 1, wherein:
the valve plug includes a set of inclined surfaces positioned between the first end and the intermediate section of the valve plug, and exposed ends of the ribs of the valve actuator press against said inclined surfaces under the influence of the second biasing means.

8. A valve assembly according to claim 7, wherein:
the inclined surfaces of the valve plug and the exposed ends of the ribs of the valve actuator are adapted so that when, upon pushing of the valve actuator, the ribs of the valve plug exit the channels, the valve plug is caused to rotate relative to the valve actuator under the influence of the second biasing means.

9. A valve assembly according to claim 8, wherein:
the internal surface of the second chamber includes a set of inclined ledges in between openings of said channels.

10. A valve assembly according to claim 9, wherein:
the inclined ledges are adapted to abut the exposed ends of the ribs of the valve actuation means after the valve plug has been caused to rotate and, under the influence of the first biasing means, guide each of the ribs into an adjoining channel of the second chamber.

11. An inflatable cushion including:
an inflatable body, having an upper surface and a lower surface, said body including an air-impermeable skin defining a chamber, an elastic foam core within said chamber and a sealable air valve; and
an external elastic foam layer substantially covering at least one of said upper and lower of surfaces,
wherein the foam core is formed of a foam having a density of between about 15 kg/m$^3$ and about 35 kg/m$^3$ and a hardness of between about 25 newtons and about 45 newtons,
wherein the foam layer is formed of a foam having a density of between about 35 kg/m$^3$ and about 65 kg/m$^3$ and a hardness of between about 35 newtons and about 95 newtons, and
wherein the sealable air valve comprises a valve assembly according to claim 1.

12. A mattress comprising:
a mattress body; and
an inflatable cushion, having an inflatable body which includes an air-impermeable skin defining a chamber, an elastic foam core within said chamber and a sealable air valve, said inflatable cushion being positioned within said mattress body,
wherein the sealable air valve comprises a valve assembly according to claim 1 and said valve is accessible at an external surface of said mattress.

* * * * *